(12) United States Patent
Banwart

(10) Patent No.: US 8,534,694 B2
(45) Date of Patent: Sep. 17, 2013

(54) POWERED CONVERTER DOLLY AND SECURING DEVICE

(76) Inventor: Donald D. Banwart, Fort Scott, KS (US)

(*) Notice: Subject to any disclaimer, the term of this patent is extended or adjusted under 35 U.S.C. 154(b) by 534 days.

(21) Appl. No.: 12/789,140

(22) Filed: May 27, 2010

(65) Prior Publication Data

US 2011/0074132 A1     Mar. 31, 2011

Related U.S. Application Data

(60) Provisional application No. 61/247,397, filed on Sep. 30, 2009, provisional application No. 61/264,392, filed on Nov. 25, 2009.

(51) Int. Cl.
    *B62D 53/02* (2006.01)
(52) U.S. Cl.
    USPC ........................................... 280/476.1
(58) Field of Classification Search
    USPC .......................... 280/476.1, 901, 432
    See application file for complete search history.

(56) References Cited

U.S. PATENT DOCUMENTS

| | | | |
|---|---|---|---|
| 3,169,012 A | | 2/1965 | Fagan |
| 3,717,363 A | * | 2/1973 | Berends ............... 280/476.1 |
| 3,764,164 A | * | 10/1973 | Lankenau ............... 280/418.1 |
| 3,827,723 A | * | 8/1974 | Neff et al. ............... 280/476.1 |
| 4,451,058 A | | 5/1984 | Curry |
| 5,098,115 A | | 3/1992 | Haire et al. |
| 5,407,221 A | * | 4/1995 | Haire et al. ............... 280/476.1 |
| 6,056,309 A | | 5/2000 | Brown |
| 6,540,246 B2 | | 4/2003 | Andersen et al. |
| 7,040,425 B2 | | 5/2006 | Hammonds |
| 7,175,134 B2 | * | 2/2007 | Hsu et al. ............... 244/104 FP |
| 7,934,743 B1 | * | 5/2011 | Wall et al. ............... 280/476.1 |
| 2009/0060695 A1 | | 3/2009 | Camaly |
| 2009/0205882 A1 | | 8/2009 | Smith et al. |

OTHER PUBLICATIONS

"Motor Vehicles (Standards) Regulations-Sect 24: Converter dollies used in road trains", *Northern Territory Consolidated Regulations* www.austlii.edu.au/au/legis/nt/consol_reg/mvr372/s24/hmtl retrieved 9/92009, 1 of 1.
"PowerPusher: If It Rolls . . . We Can Move It.", www.powerpusher.com/The_Power_Pusher.htm referenced 9/60/2009.

* cited by examiner

*Primary Examiner* — Tashiana Adams
(74) *Attorney, Agent, or Firm* — Law Office of Mark Brown, LLC; Mark Brown; Christopher M. DeBacker

(57) ABSTRACT

A powered converter dolly for movement and attachment of trailers is provided. The dolly comprises a conventional converter dolly having a retractable landing gear assembly mounting wheels attached to the drawbar. The dolly has a power supply and operates as a towing device. The landing gear assembly provides steering for the dolly as well as motive power from a motor connected to the landing gear wheels. Alternatively, the wheels of the dolly may be powered for providing motion to the dolly. The dolly further comprises several attachment devices for securing the dolly to an intermodal railcar, including alternative hydraulic, mechanical, and electrically-powered tie down devices. A trolley movable along a railcar is provided for securing the dolly or trailer to the railcar and includes a hitch component for selectively interconnecting to a hitch component on the dolly or trailer.

8 Claims, 45 Drawing Sheets

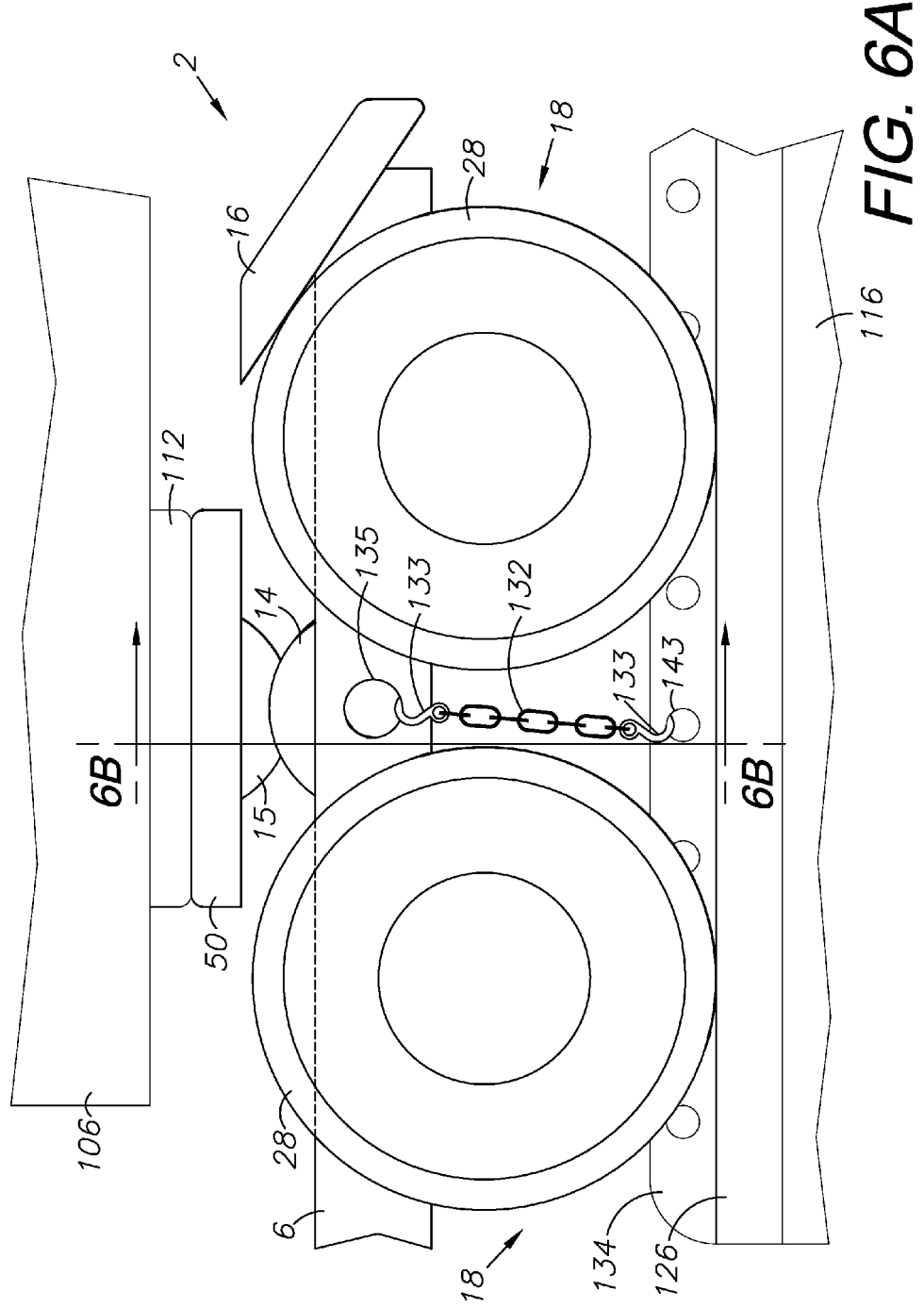

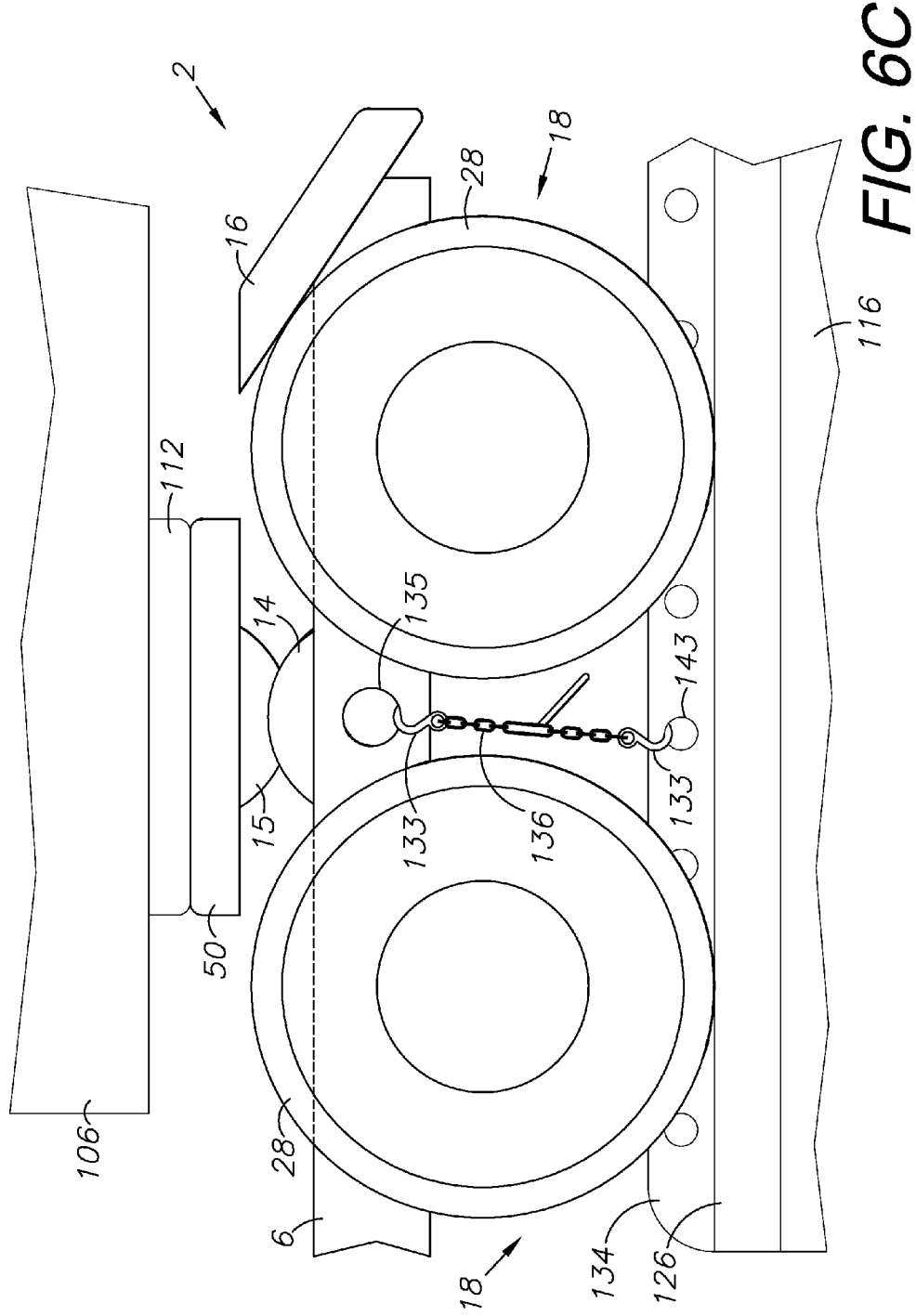

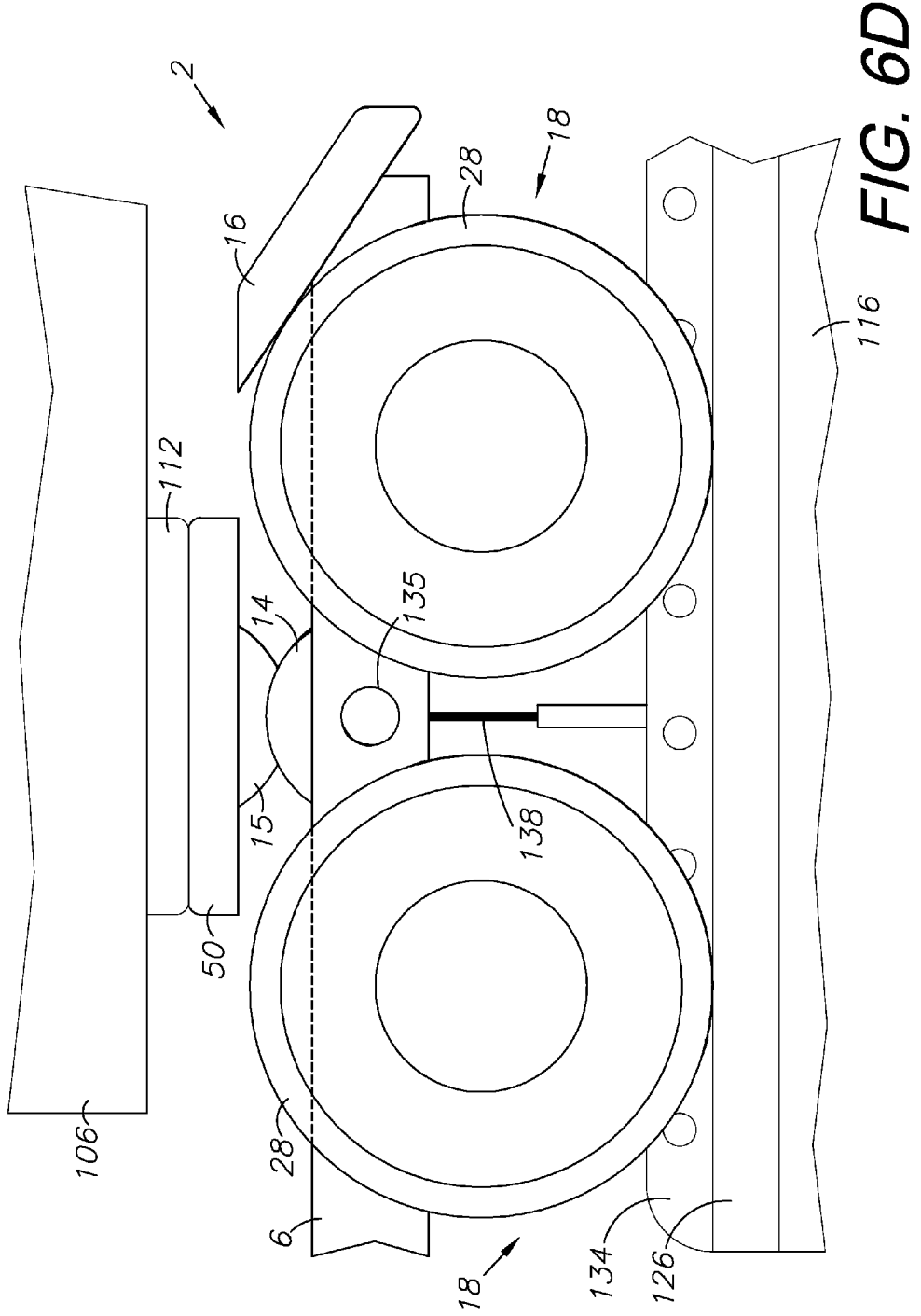

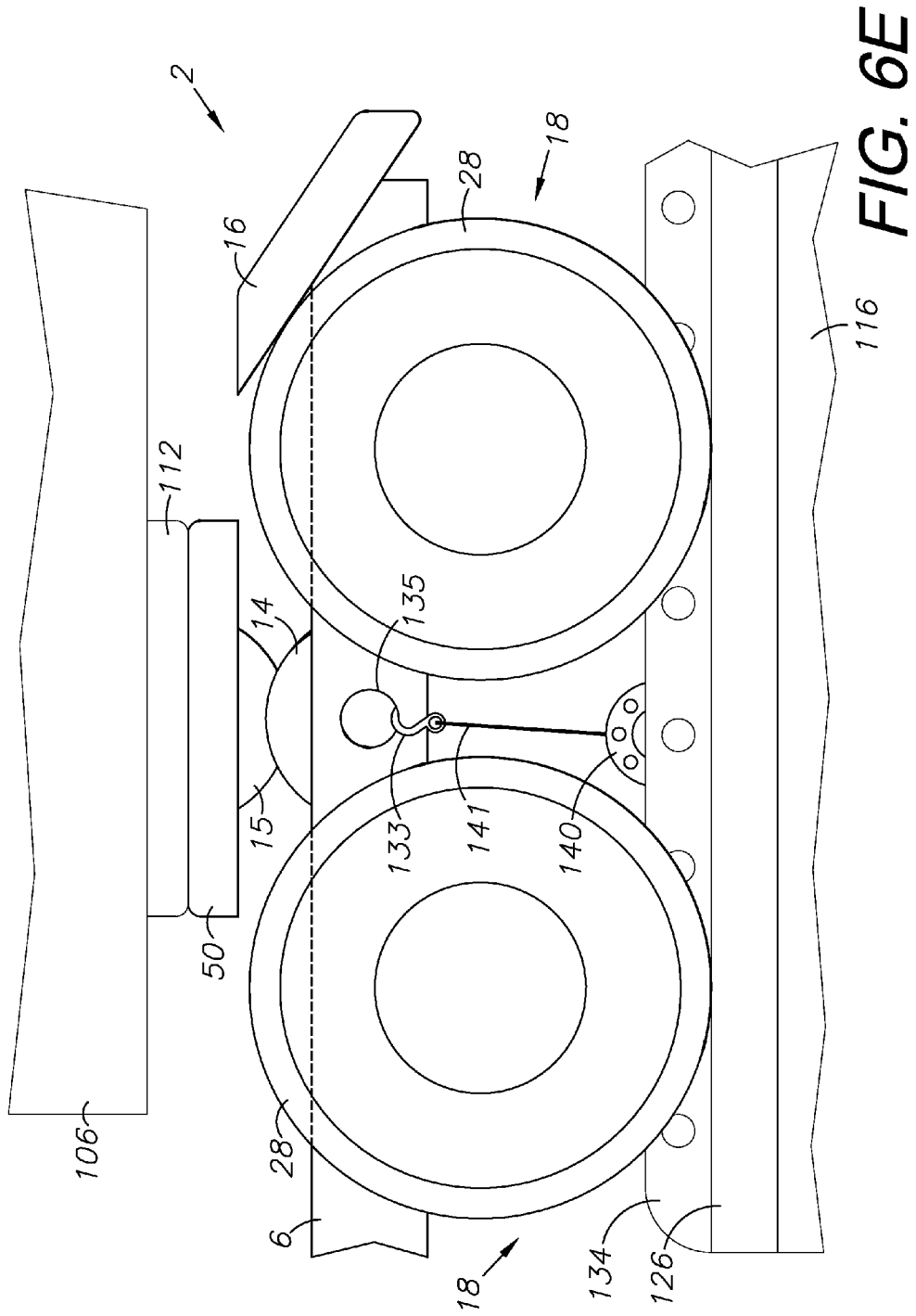

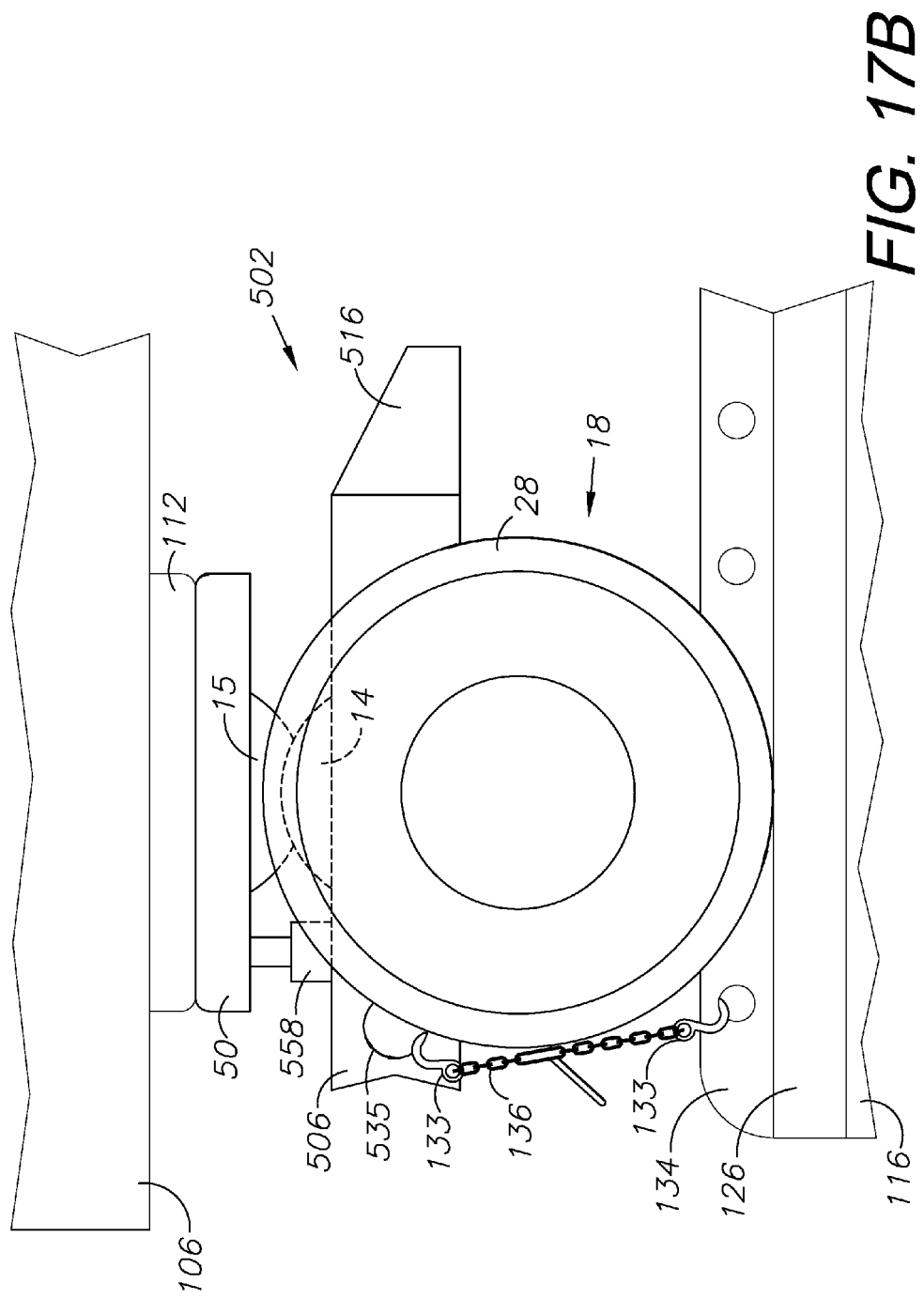

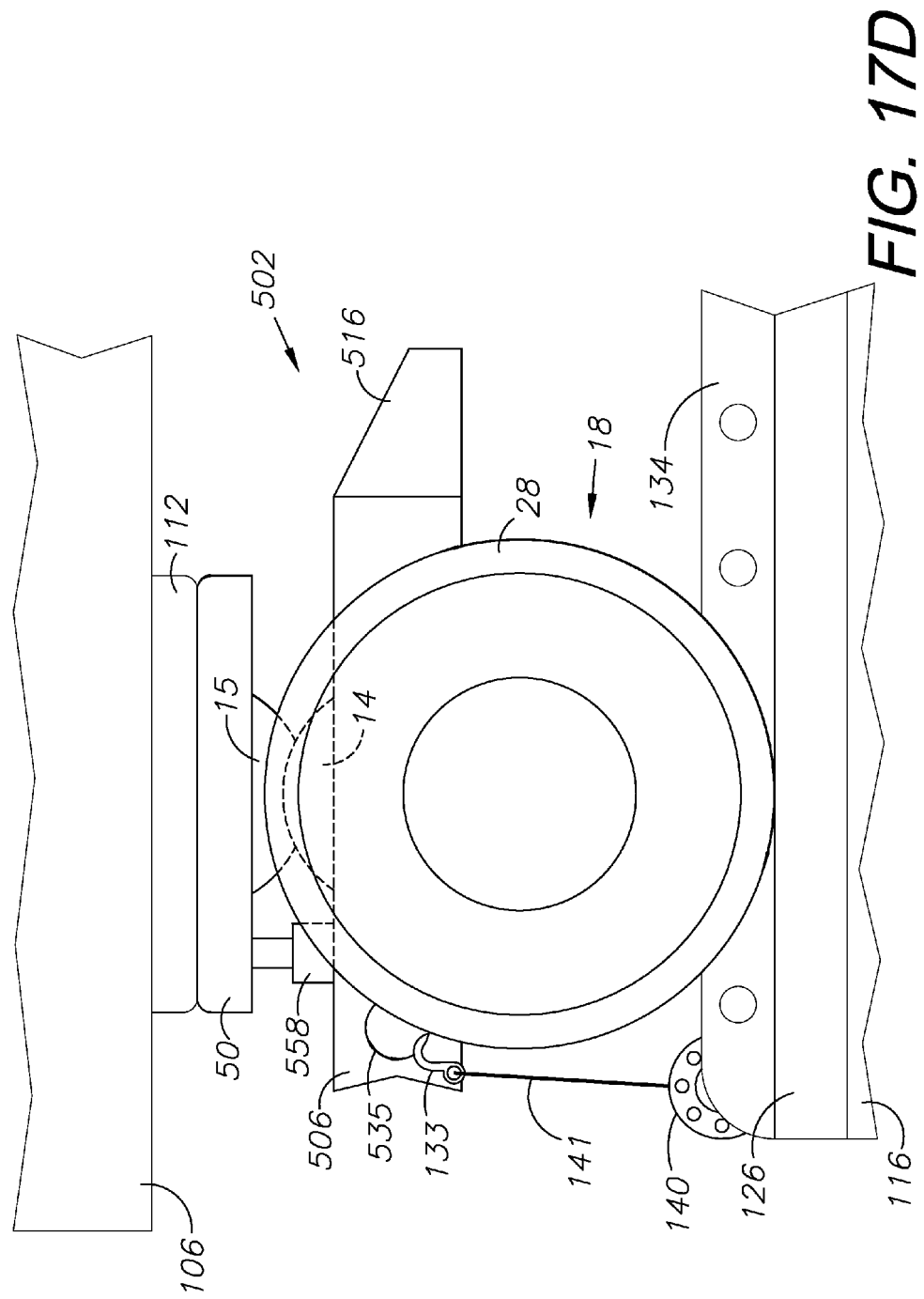

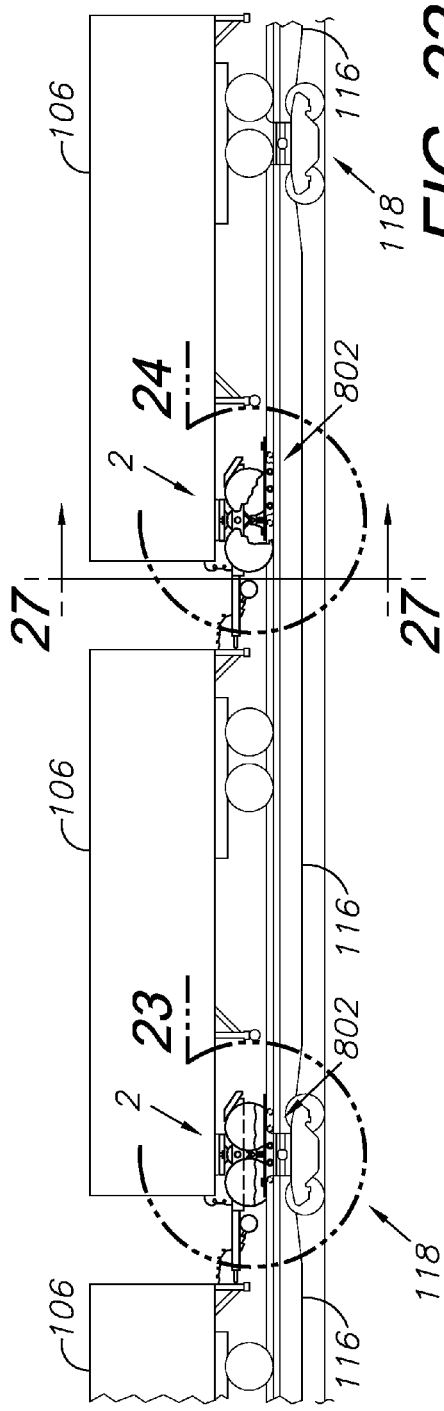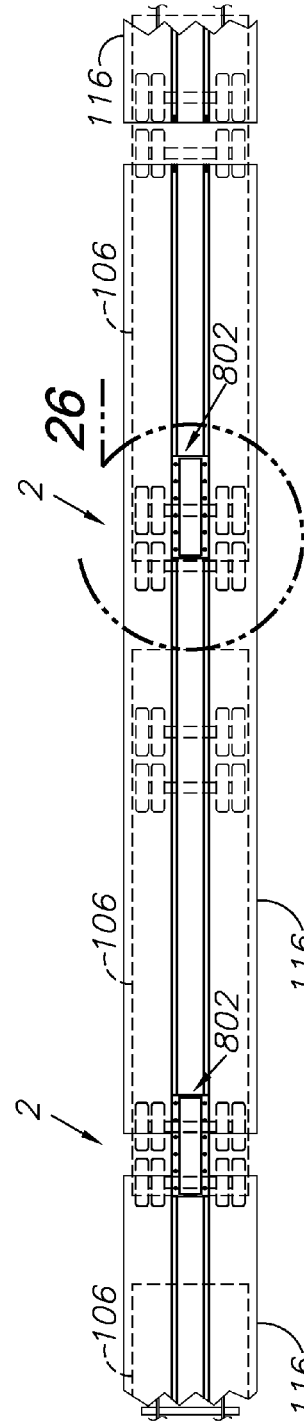

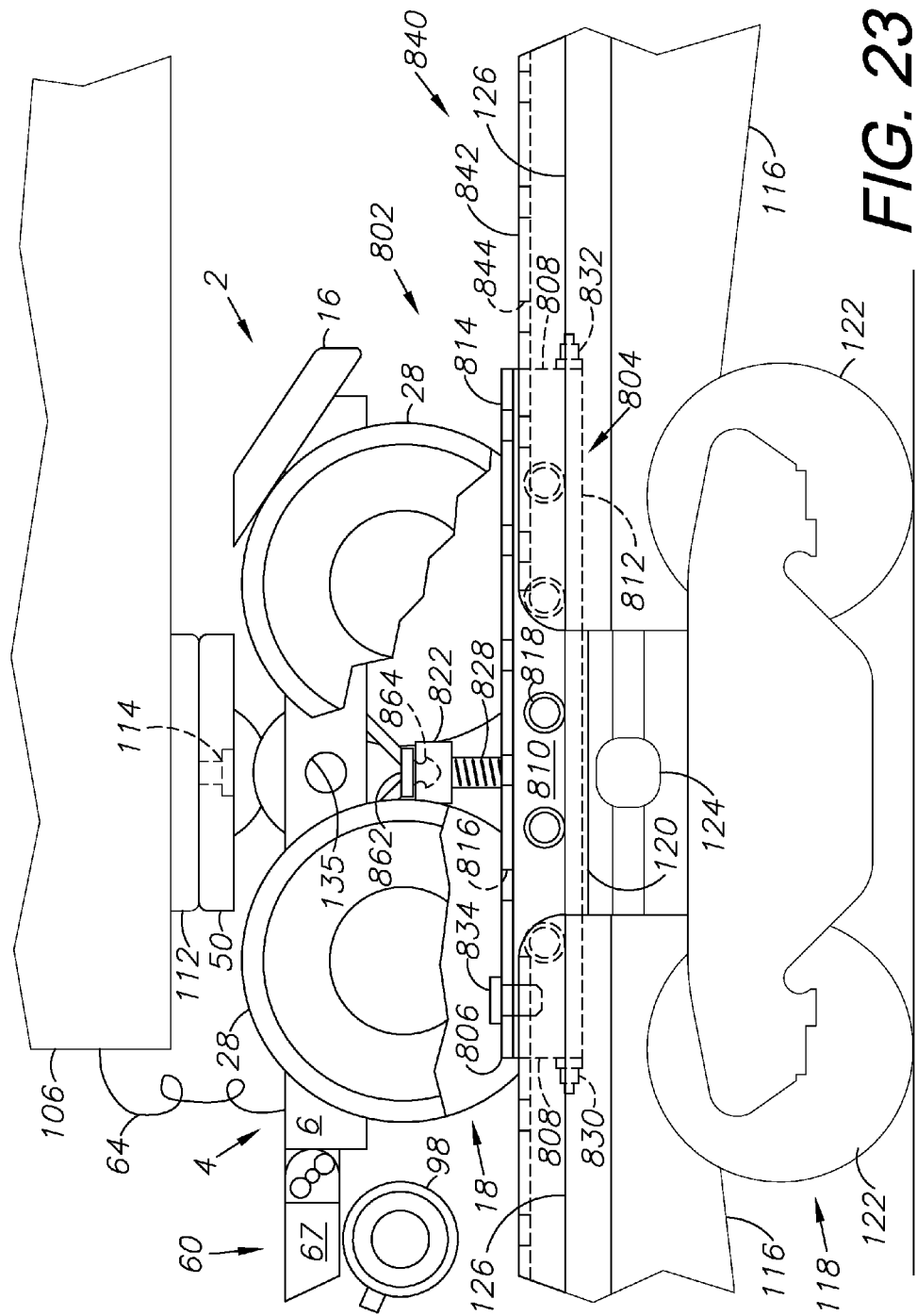

US 8,534,694 B2

POWERED CONVERTER DOLLY AND SECURING DEVICE

CROSS-REFERENCE TO RELATED APPLICATIONS

This application claims the benefit of U.S. Provisional Patent Application No. 61/247,397, filed Sep. 30, 2009, and U.S. Provisional Patent Application No. 61/264,392, filed Nov. 25, 2009, which are incorporated herein by reference.

BACKGROUND OF THE INVENTION

1. Field of the Invention

The present disclosed technology relates generally to trailer transportation and securing devices, and in particular a converter dolly that is self-powered for movement around a trailer yard and for movement into contact with a lead-trailer and a load-trailer, and a trolley that rolls within a channel in the middle of a railroad flatcar capable of securing a load thereto.

2. Description of the Related Art

A converter dolly is used to attach a load-trailer to a lead-trailer or tractor-trailer assembly thereby enabling a tractor-trailer assembly to pull two or more trailers. Converter dollies generally consist of a frame having one or two axles, a coupling member for attachment to a lead-trailer, and a fifth wheel plate attached to the top of the frame above the axles for engaging the kingpin of a load-trailer. The conventional method of assembling dollies and load-trailers requires one or more people to manually maneuver an uncoupled dolly around a trailer yard and into contact with an uncoupled trailer. After the load-trailer dolly assembly is created, a tractor-trailer assembly is backed up to it for joining of the two assemblies. This procedure is repeated for each load-trailer dolly assembly that is attached to a lead trailer.

The conventional method of assembling trailers and dollies creates dangerous conditions for people maneuvering the dollies and attaching them to a tractor-trailer, and for personnel around backward moving tractor-trailer assemblies. A great deal of manual effort is required of an operator to lift the front end of the dolly off the ground and keep the dolly under control when maneuvering it around the trailer yard coupling it to a load-trailer, or assisting with coupling the dolly to a lead-trailer.

Problems may be encountered when transporting trailers, and multiple linked dolly and trailer assemblies on railcars, and properly securing them to the railcar due to the securing points on the dollies and trailers being in unpredictable locations.

What is needed is the ability to maneuver dollies into alignment and coupling with load-trailers, and the ability to move the load-trailer dolly assembly into alignment and coupling with a lead-trailer, without requiring undue effort by an operator, or putting the operator and other personnel into a dangerous situation. In addition, what is needed is the ability to secure multiple trailer, and dolly and trailer assemblies to a railroad flatcar for intermodal transportation.

Heretofore there has not been available a converter dolly with the advantages and features of the disclosed subject matter.

SUMMARY OF THE INVENTION

A self-powered converter dolly suitable for highway transportation is provided for moving trailers around a yard, and for joining trailers with lead-trailers. The dolly includes a frame having one or more axles and wheels, a fifth wheel, and a drawbar and ring coupling. The drawbar may be fixed in relation to the dolly or pivot. A powered, steerable landing gear is attached to the drawbar of the dolly. The landing gear has a steering control module with a hydraulic leg extending therefrom attaching wheels. The steering control module controls the direction of the landing gear wheels, and the extending and retracting of the hydraulic leg for positioning the dolly ring coupling at the right height for connection with a lead-trailer. The wheels are connected to a motor that provides rotational movement to the wheels enabling the dolly to move under its own power, and to move an attached trailer around a trailer yard. The motor on the landing gear can be either hydraulically-powered or electrically-powered with the respective power source being located on the dolly. In addition, the dolly provides a compressed air source to operate the air brakes on the dolly and the load-trailer.

The dolly is controlled by an operator using a remote control enabling the operator to remain in a safe location away from the dolly and trailer when moving the dolly, connecting the dolly to a load-trailer, and when connecting a dolly and load-trailer assembly to a lead trailer. Moreover, the self-powered converter dolly allows one operator to safely maneuver the dolly around the trailer yard, and to couple the dolly and trailers together avoiding excessive physical strain and injury to personnel.

The steerable landing gear may be used with a dolly having power supplied to the wheels on the axles of the dolly instead of power supplied to the landing gear wheels. For dollies having only one axle, the pitch of the fifth wheel can be adjusted by a hydraulic cylinder that pushes the wheels of the landing gear into the ground allowing the wheels to have traction. Alternatively, the fifth wheel can be provided with a hydraulic scissor lift permitting an operator to move trailers around a trailer yard without needing to retract the landing gear on the trailer.

The dolly may be used with intermodal transportation systems utilizing railway flatcars providing an attachment point for securing the dolly to the railcar. The dolly may be secured to the railcar using a tie down such as a chain, ratchet load binder, hydraulic cylinder, a winch and cable, or a hitch and receiver component.

Alternatively a trolley system having a trolley with an adjustable receiver, and movable along the length of a railcar may be used to secure a dolly or trailer to an intermodal railcar. The trolley moves within a trolley guide attached to the railcar. The trolley is maneuvered into a position for attachment to a dolly or trailer and immobilized by inserting a pin into a hole in the trolley that aligns with a hole in the trolley guide. A circular receiver is then raised to the appropriate height to engage a circular hitch component attached to the dolly and is secured thereto. The receiver may then be further adjusted to prevent further movement of the dolly connected thereto. The trolley is also adapted to provide a fifth wheel type receiver for securing a trailer having a kingpin to a railcar. The trolley is further provided with several mechanisms and actuators for raising and lowering the receiver into position with a hitch.

BRIEF DESCRIPTION OF THE DRAWINGS

The drawings constitute a part of this specification and include exemplary embodiments of the invention illustrating various objects and features thereof, wherein like references are generally numbered alike in the several views.

FIG. 6A is an enlarged elevational view of the tie down mechanism taken generally within circle 6A in FIG. 5.

FIG. 6C is an alternative tie down mechanism.

FIG. 6D is another alternative tie down mechanism.

FIG. 6E is another alternative tie down mechanism.

FIG. 17B is an alternative tie down mechanism.

FIG. 17D is another alternative tie down mechanism.

FIG. 22 is an elevational view of the dolly connected to a trailer on a railcar, and the trolley connected to the dolly.

FIG. 23 is an enlarged elevational view of the trolley connected to the dolly taken generally within circle 23 in FIG. 22.

FIG. 25 is a plan view of the trolley connected to a dolly on a railcar of FIG. 22.

DESCRIPTION OF THE PREFERRED EMBODIMENT

I. Introduction and Environment

Figure 1:
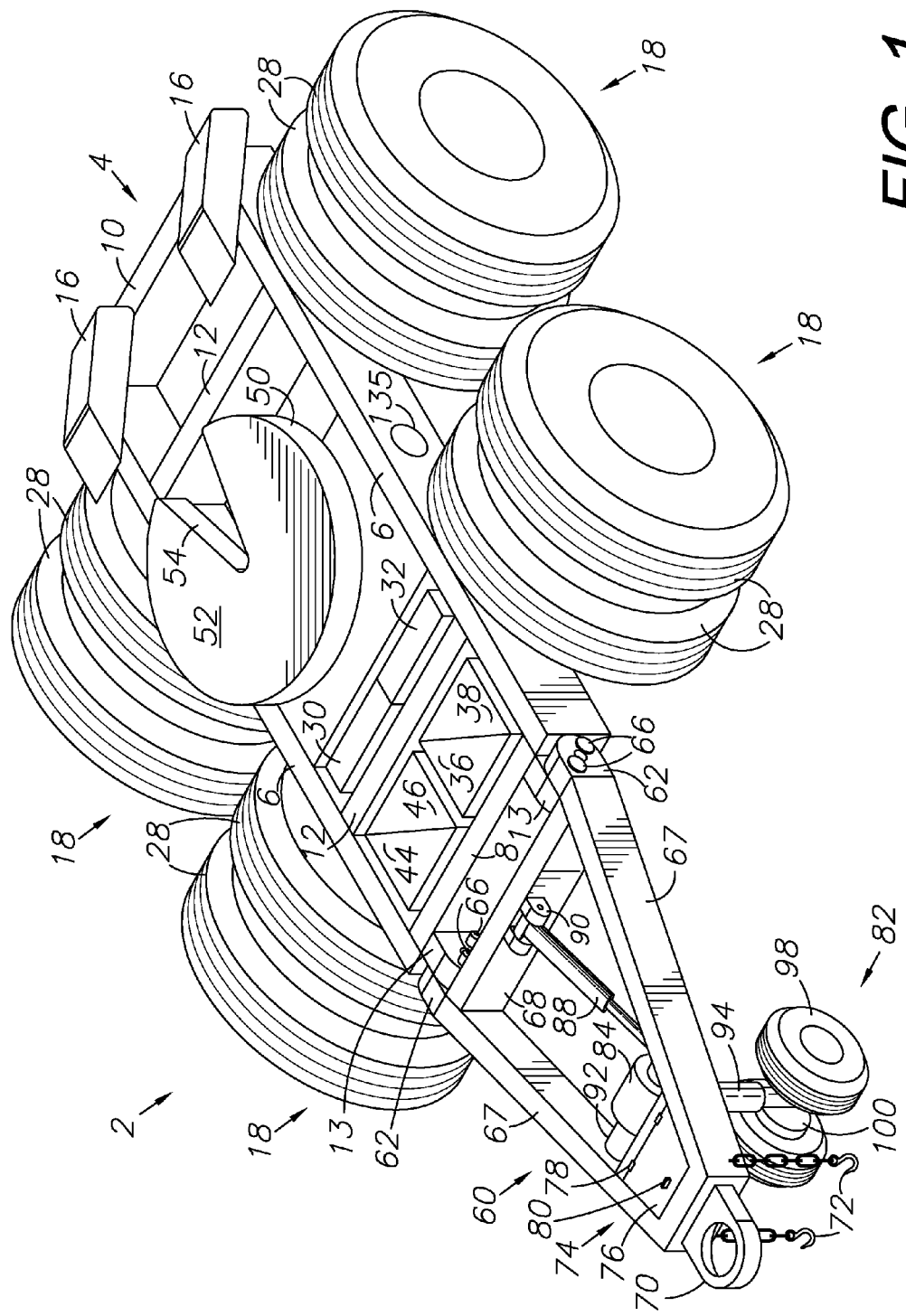
FIG. 1 is a perspective view of a powered converter dolly embodying principles of the disclosed subject matter where the drawbar pivots on the dolly frame, and the wheels on the landing gear are the powered drive wheels.

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Embodiment of the Powered Converter Dolly 2

Referring to the drawings in more detail, the reference numeral 2 generally designates a powered converter dolly suitable for highway transportation embodying the principles of the disclosed subject matter. The dolly 2 generally consists of a rectangular frame 4 having one or more axle assemblies 18 depending therefrom, and mounting a hitch component 50, such as a fifth wheel. An independent drawbar assembly 60 extends forward from the frame 4 and terminates at a ring coupling 70. A steerable landing gear assembly 82 is attached to the drawbar assembly 60 providing powered movement and controlling the direction of movement of the dolly 2. The dolly 2 may be attached to an object, such as a load-trailer 106, for moving the trailer 106 around a trailer yard, or to connect the trailer 106 to a lead-trailer 105.

Figure 2:
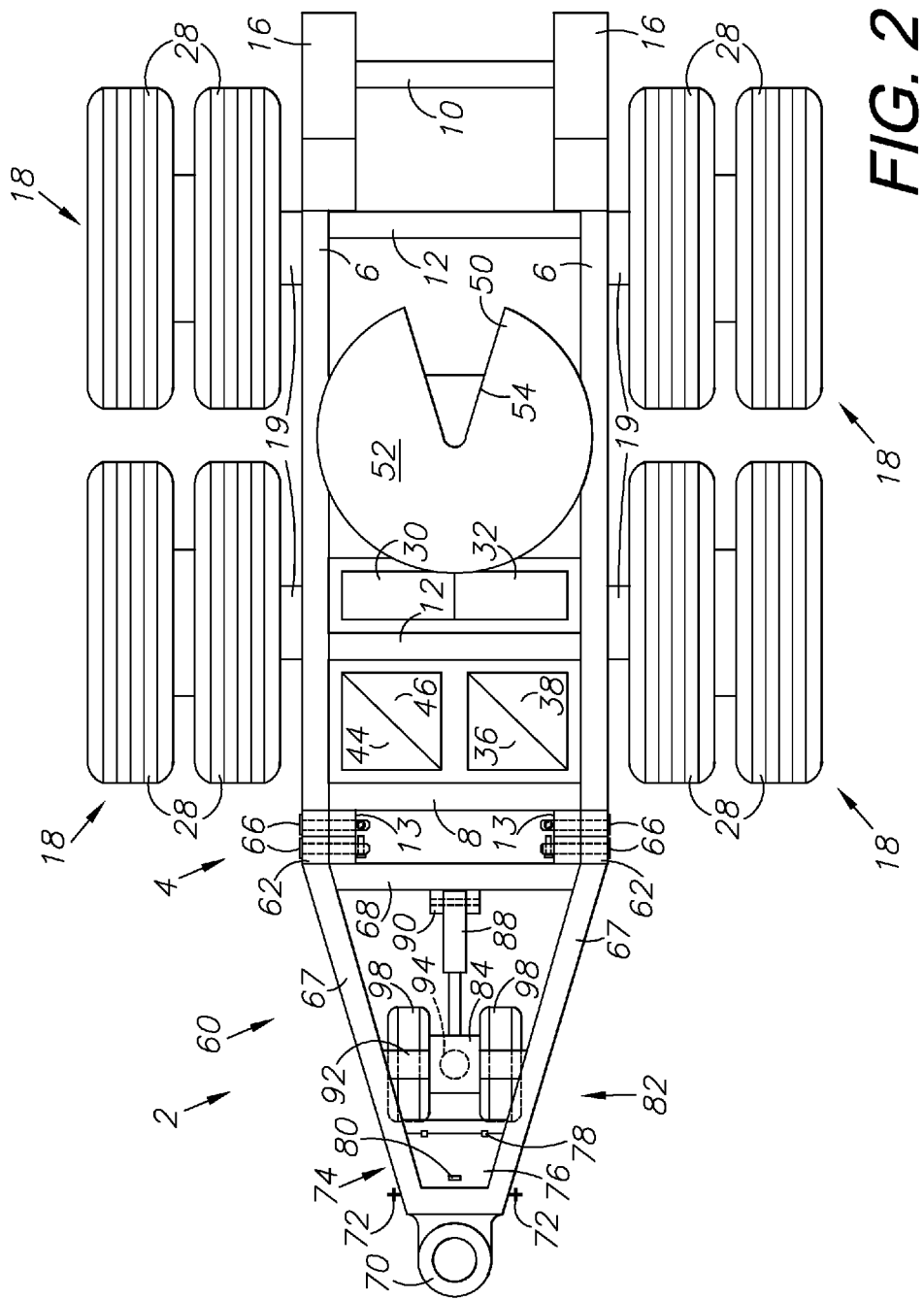
FIG. 2 is a plan view of the converter dolly of FIG. 1.
Figure 3:
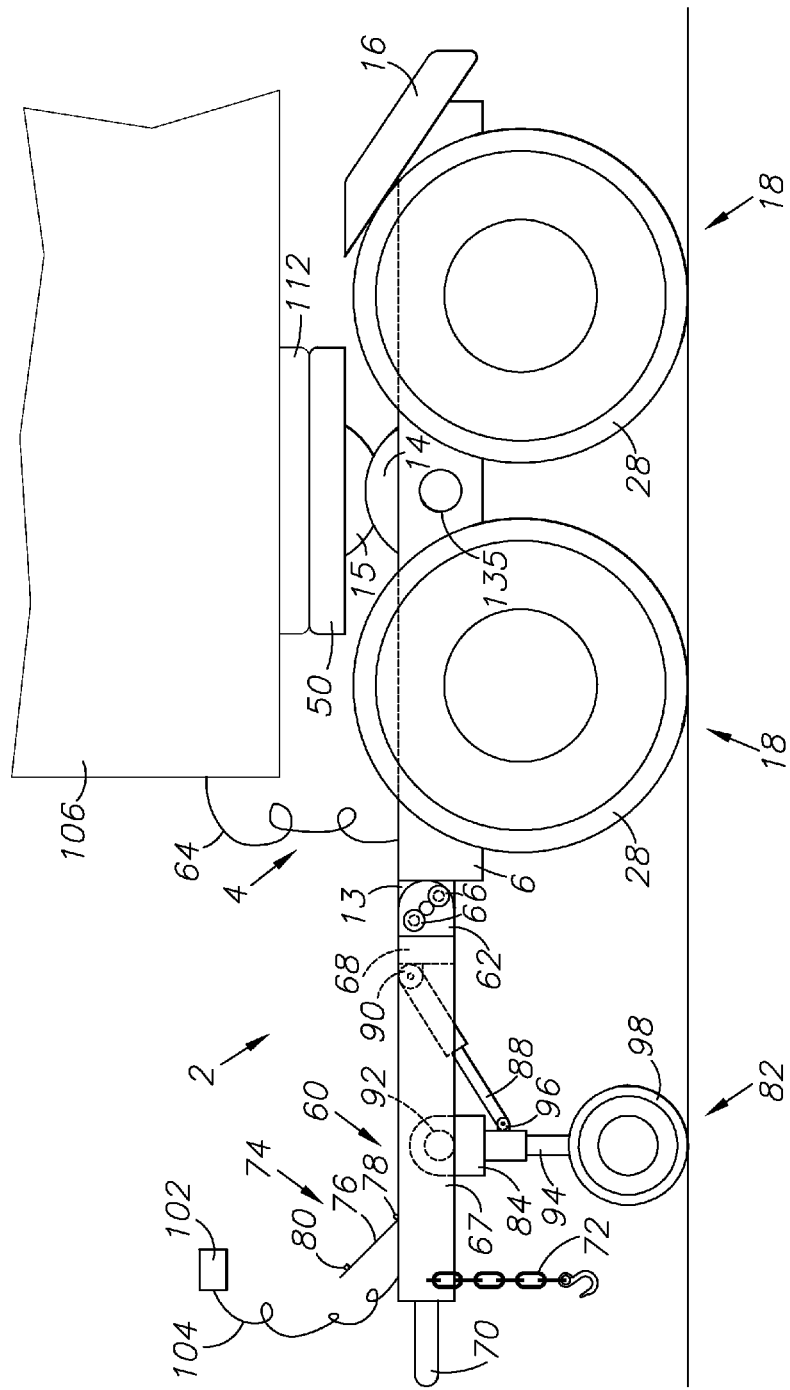
FIG. 3 is an elevation view of the converter dolly of FIG. 1 with the landing gear extended.

Referring to FIGS. 1-6F, an embodiment of the dolly 2 is shown and described having two axle assemblies 18 depending therefrom including wheels 28 and air brakes, and a powered, steerable landing gear assembly 82 attached to a movable drawbar assembly 60. Referring to FIGS. 1-3, the dolly 2 is shown freestanding with the drawbar assembly 60 releasably secured to the frame 4, and the landing gear assembly 82 in an extended position with landing gear wheels 98 engaging the ground.

The dolly 2 frame 4 may be manufactured from metal, preferably steel, and is generally rectangular in configuration having opposite side rails 6 extending forward and rearward along the length of the frame 4. The side rails 6 are joined at the front end by a front rail 8, and joined at the rear end by a rear rail 10 using a secure connection such as a weld, or by fasteners such as bolts. Cross members 12 span between the side rails 6 adding rigidity to the frame 4, and permit mounting of the hitch component 50, and accessories. A pair of axle assemblies 18 each having four ground engaging wheels 28 and air-powered brakes, depend from the frame 4. The second hitch component 50 fifth wheel comprises a generally circular metal pickup plate 52 having an elongated, triangular-shaped slot 54 open at the rear for aligning a hitch component 114 such as the kingpin of a trailer 106 with the pickup plate 52. The pickup plate 52 is pivotally mounted to the frame 4 by brackets 14, 15 allowing the pickup plate 52 to pitch forward or backward as needed to engage the hitch component 114. The rear of the frame 4 may contain inclined ramps 16 for properly guiding a trailer 106 into engagement with the hitch component 50. The front of the frame 4 has a pair of brackets 13 for rotatably mounting the drawbar assembly 60 to it.

The drawbar assembly 60 is manufactured from metal, preferably steel, and is generally triangular in configuration. The drawbar assembly 60 has two side rails 67 originating from the ends of a cross member 68 located nearest the frame 4, and extends forward terminating at a ring coupling 70. The ring coupling 70 is mounted at the forward most end of the dolly 2 for engagement with a coupling 110 on a lead-trailer 105. The coupling 110 may include, but is not limited to a pintle hook coupling or a combination ball hitch. Lead-trailers 105 can have couplings 110 located at different heights above the ground. Therefore, the drawbar assembly 60 of the dolly 2 is rotatably mounted to the frame 4 by brackets 62. Rotation of the drawbar assembly 60 with respect to the frame 4 enables engagement of the ring coupling 70 to couplings 110 located at different heights above the ground. Each of the brackets 13, 62 have removable lock-out pins 66 for preventing rotation of the drawbar assembly 60 with respect to the frame 4. Preventing rotation of the drawbar assembly 60 allows rigid engagement of the landing gear assembly 82 with the ground, described in more detail below. Safety chains 72 located adjacent to the ring coupling 70 may be attached to a leading trailer 105 for added safety in case the trailer 105 and dolly 2 become uncoupled.

The landing gear assembly 82 is rotatably attached to the drawbar assembly 60 between the side rails 67 by a pivot shaft 92, and generally consists of a steering control module 84 having a telescoping leg 94 projecting therefrom. Ground engaging wheels 98 at the distal end of the leg 94, are powered by a drive motor 100 that causes the wheels 98 to rotate in both a clockwise and counterclockwise direction to provide movement to the dolly 2. The type of motor 100 used may include, but is not limited to an electrically-powered, or hydraulically-powered motor. The steering control module 84 contains an actuator (not shown) for rotating the leg 94 and wheels 98 about a vertical axis for steering the dolly 2, and an actuator (not shown) for extending and retracting the telescopic leg 94. The aforementioned actuators may include, but are not limited to an electrical actuator or a hydraulic actuator. Another actuator 88 extends between the leg 94 and cross member 68 for moving the landing gear assembly 82 between an extended and retracted position. The aforementioned actuator 88 may include, but is not limited to an electric, hydraulic, or pneumatic actuator, preferably a hydraulic actuator. The actuator 88 attaches to the leg 94 and cross member 68 by brackets 96, 90, respectively.

The dolly 2 is self-powered, providing power from one or more of the following power sources: hydraulic power from a hydraulic pump 44 and hydraulic reservoir 46; electrical power from a generator 38 and rechargeable batteries 36; and compressed air from an air compressor 30 and an air tank 32. Hydraulic power may be provided to: the actuator 88 to extend and retract the landing gear assembly 82 between a ground-engaging position and a transportation position; the steering control module 84 to power the actuator that extends and retracts the telescopic leg 94, and the actuator that rotates the leg 94 and wheels 98 for steering the dolly; and the drive motor 100 that provides movement to the wheels 98 for moving the dolly 2. Electrical power is provided to operate the hydraulic pump 44, air compressor 30, and to recharge the batteries 36. Alternatively, electrical power may be provided to electrical actuators in the steering control module 84, to the actuator 88 on the leg 94, or to an electrical drive motor 100. The dolly 2 may incorporate any combination of hydraulic, pneumatic or electrical actuators or motors 100 as deemed necessary for a particular application. Compressed air may be provided to: the actuator 88 on the leg 94; the air brake system of the dolly 2; and for connection to the air-brake system of the load-trailer 106 for releasing the air brakes without the need for the trailer 106 to be connected to a tractor.

Referring to FIG. 3, the dolly 2 is shown connected to a load-trailer 106. The dolly 2 has a remote control 102 containing a microcontroller and switches for controlling operation of: the landing gear assembly 82; actuator 88; the actuators in the leg 94 and steering control module 84; dolly 2 air brakes; and the hydraulic, pneumatic, or electrical power sources. The remote control 102 may include a safety feature that requires the operator to use both hands to operate the device, and an emergency off feature whereby the operator can cease all movement and activity of the dolly 2 and load-trailer 106 by rapidly engaging the air brakes of both. When not in use, the remote control 102 is securely stored within a storage box 74 located on the dolly 2. The storage box 74 has a lid 76 that opens on hinges 78 by lifting on a handle 80. A lengthy cord 104 connects the remote control 102 to the dolly 2 enabling an operator to position themselves out of danger, or into a better vantage point, when maneuvering the dolly 2 or an attached trailer 106.

The dolly 2 is prepared for use in maneuvering a trailer 106 by inserting the lock-out pins 66 into the brackets 13, 62 to secure the drawbar assembly 60 to the frame 4 preventing their rotation thereabout. A rigid connection between the drawbar assembly 60 and frame 4 enables the wheels 98 of the landing gear assembly 82 to have fraction with the ground. Using the remote control 102, an operator powers up the dolly 2 and extends the actuator 88 positioning the landing gear assembly 82 perpendicular to the drawbar assembly 60, and the wheels 98 in contact with the ground. The motor 100 rotates the wheels 98 and moves the dolly 2 in the direction the wheels 98 are pointing. The dolly 2 is maneuvered underneath the trailer 106 enabling engagement of the hitch component 50 with the bearing plate 112. The dolly 2 air brakes are then engaged. A supply line 65, providing an electrical and air connection between the dolly 2 and trailer 16, is connected allowing the operator to engage and disengage the air brakes on the trailer 106 using the air tank 32 on the dolly 2. Once the operator releases the air brakes on the trailer 106 and dolly 2, the motor 100 provides movement to the dolly 2 permitting the dolly 2 maneuver the trailer 106 around for repositioning or to connect the dolly 2 and trailer 106 assembly to a lead-trailer 105. During movement, the dolly 2 and trailer 106 assembly can be stopped using either the air brakes on the dolly 2 or the trailer 106.

Figure 4:
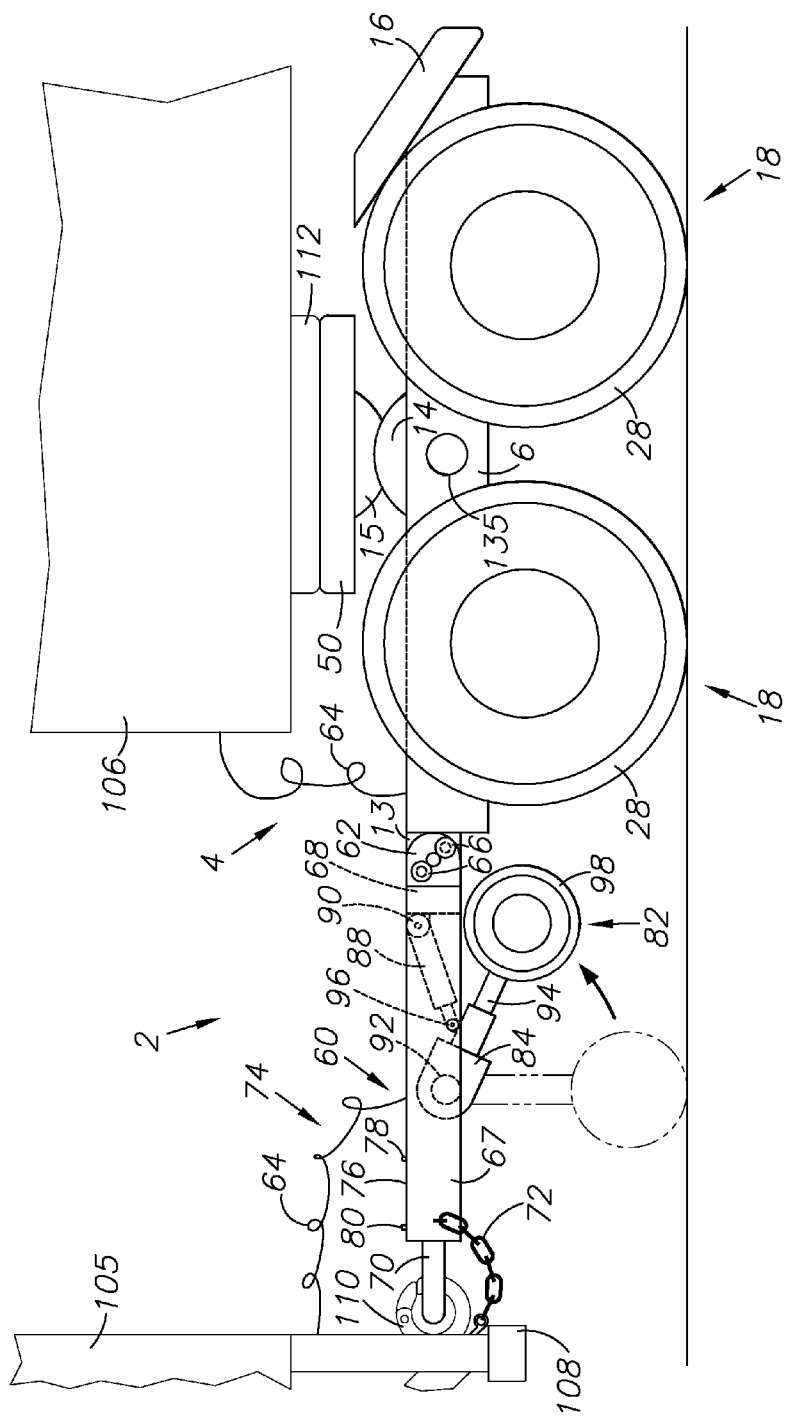
FIG. 4 is an elevational view of the converter dolly of FIG. 1 coupled to a load-trailer and a leading trailer, with the dolly landing gear retracted.

Referring to FIG. 4, the dolly 2 is shown connected to a lead-trailer 105 with the landing gear assembly 82 in the highway transportation position. An operator aligns and connects the dolly 2 to a lead trailer 105 by positioning the ring coupling 70 in close proximity to the coupling 110 located on the bumper 108 of a lead trailer 105. The operator engages the air brakes of the load-trailer 106. The lock-out pins 66 are then removed and the leg 94 can retract to lower the ring coupling 70 onto a coupling 110 that is positioned low on the bumper 108, or the leg 94 can be extended to raise the ring coupling 70 up to a coupling 110 that is positioned high on the bumper 108. When the ring coupling 70 is securely engaged within the coupling 110, the safety chains 72 are connected to the bumper 108, and a supply line 64 is connected between the lead trailer 105 and the dolly 2 providing an electrical and air connection between the two trailers 105, 106. The landing gear assembly 82 is removed from contact with the ground by retracting the actuator 88 thereby rotating the assembly 82 until the wheels 98 are underneath the rear of the drawbar assembly 60. This positioning permits the necessary clearance between the ground and the wheels 98 when the trailers 105, 106 and dolly 2 are traveling roadways. The remote control 102 is returned to the storage box 74 during highway transportation. An electrical connection between the lead-trailer 105 and the dolly 2 can provide power for recharging the batteries 36 between uses.

The dolly 2 is disengaged from the lead trailer 105 by disconnecting the safety chains 72 and the supply line 64 between the lead trailer 105 and the dolly 2, powering up the dolly 2, engaging the air brakes of the following trailer 106 using the air supply from the dolly 2, extending the actuator 88 until the wheels 98 are in contact with the ground, and extending the leg 94 to raise the ring coupling 70 off of the coupling 110. The height of the drawbar assembly 60 is adjusted by extending and retracting the leg 94 to permit re-installation of the lock-out pins 66. Once there is a rigid connection between the drawbar assembly 60 and the frame 4, the operator can engage the motor 100 to move the dolly and trailer 106 away from the lead trailer 105.

Figure 5:
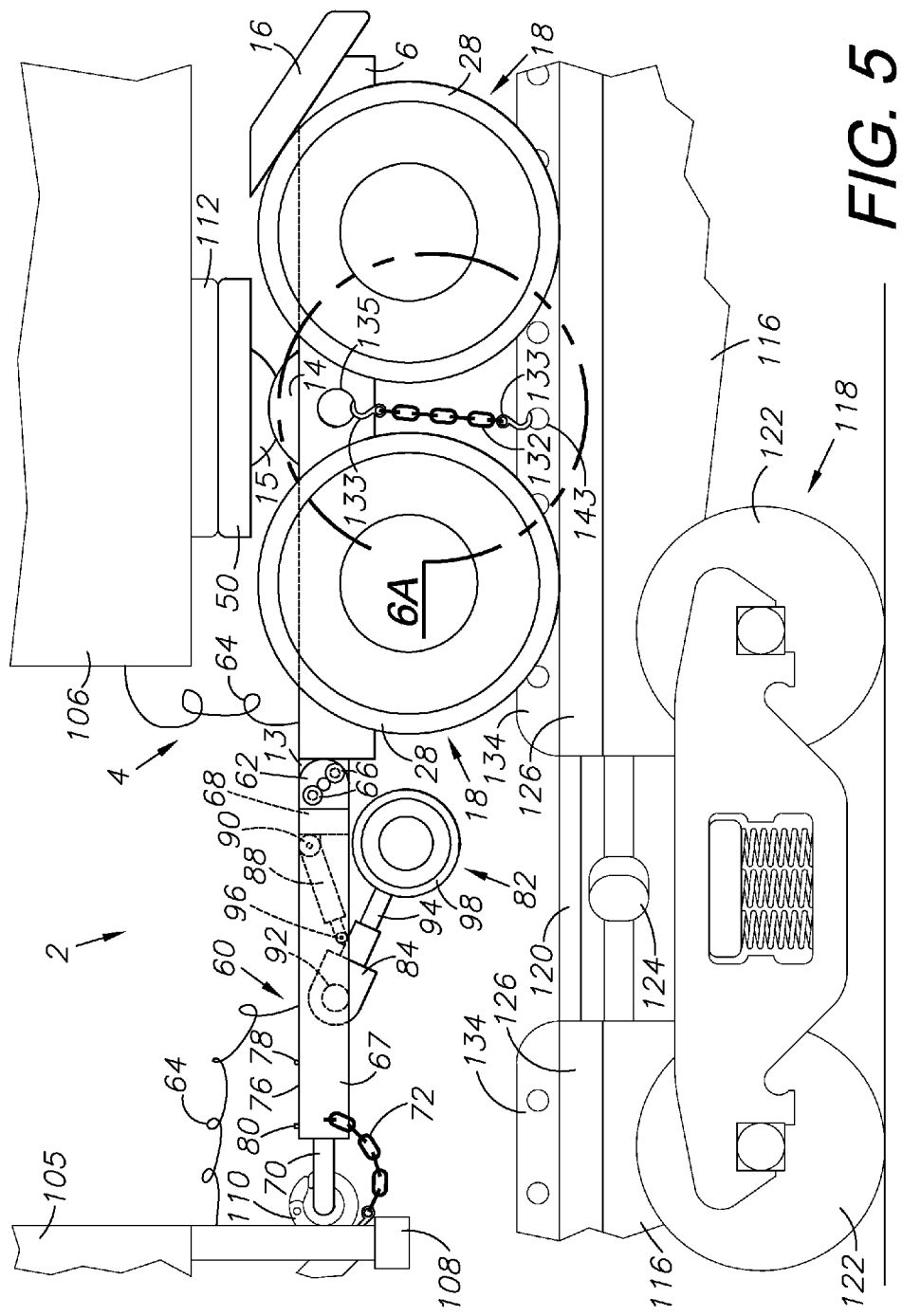
FIG. 5 is an elevational view of the converter dolly of FIG. 4 attached to an intermodal railroad flatcar.
Figure 6B:
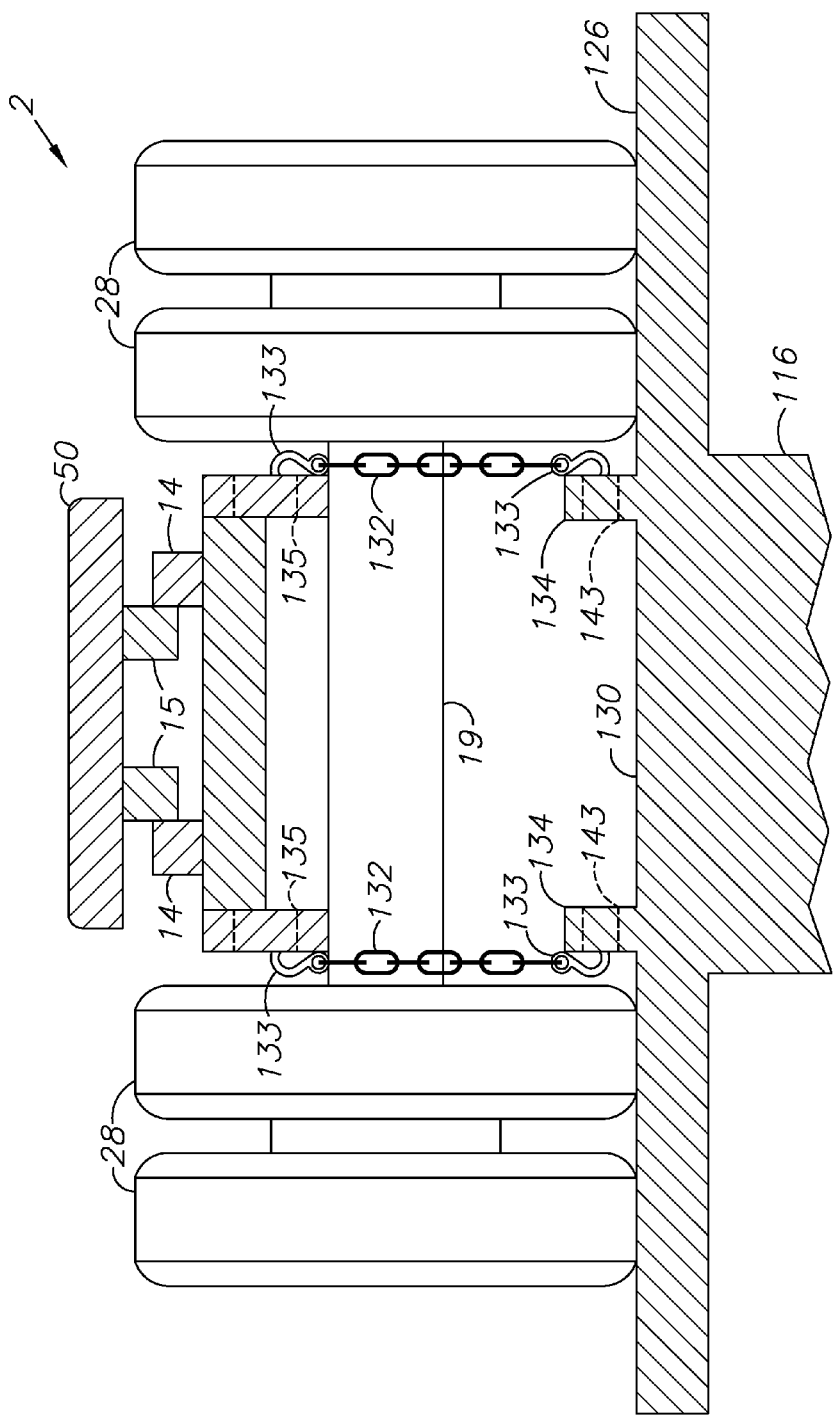
FIG. 6B is a sectional view of a tie down mechanism taken along the line 6B in FIG. 6A.

Referring to FIGS. 5-6B, the dolly 2 is shown, with the landing gear assembly 82 retracted into the highway transportation position, attached to a lead-trailer 105 and a load-trailer 106, on an intermodal railway flatcar 116. A similar intermodal railway flatcar system using railway flatcars to transport trailers connected by dollies is found in U.S. Provisional Patent Application No. 61/247,397 to Banwart, filed Sep. 20, 2009, the contents of which are herein incorporated by reference in their entirety. A typical intermodal railway flatcar 116 assembly is shown having a deck 126 for supporting the dolly 2 and trailers 105, 106. The railway flatcar 116 rides on a bogie 118 with wheels 122. Typically a ramp 120 may span the railcar coupling 124 permitting one or more dolly 2 and trailer 106 assemblies to be driven onto two or more railway flatcars 116 while still being connected to a lead-trailer 105. While one dolly 2 connecting two trailers 105, 106 is shown, one or more dollies and corresponding trailers may be jointed to create a lengthy "train" of trailers connected by dollies. The particular railway flatcar 116 shown has a channel 130 bound by rails 134 running down the middle for attaching and storing a tie down, such as a chain 132. The tie downs attach at one end to the dolly 2 by a hook 133 at one or more attachment points such as a lashing ring, mounting ring, or an aperture 135 in the frame, and attach at the other end by a hook 133 to an aperture 143 in the rail 134. The tie down secures the dolly 2 to the railway flatcar 116 while it is being transported on rail lines. When the intermodal railway flatcar 116 reaches a destination where the trailers 105, 106 are to be unloaded from the railway flatcar 116, the tie down is disconnected from the attachment point 135 and remains with the railcar 116. Thereafter, the dolly 2 and trailers 105, 106 can be driven off the railcars 116.

FIGS. 6C-6F show alternative types of tie downs that may be used to secure the dolly 2 to the railcar using the apertures 134 on the deck 126 of the railcar 116, and the attachment points 135 on the dolly 2.

FIG. 6C shows a ratchet load binder 136 with hooks 133 securing the dolly 2 to the railcar 116 at the attachment point 135 and aperture 143.

FIG. 6D shows a hydraulic tie down, such as a hydraulic cylinder 138 secured at one end to the deck 126 and at the opposite end on the dolly 2.

FIG. 6E shows an electrical tie down secured at one end to the deck 126 and at the opposite end by a hook 133 to the attachment point 135 on the dolly 2.

Figure 6F:
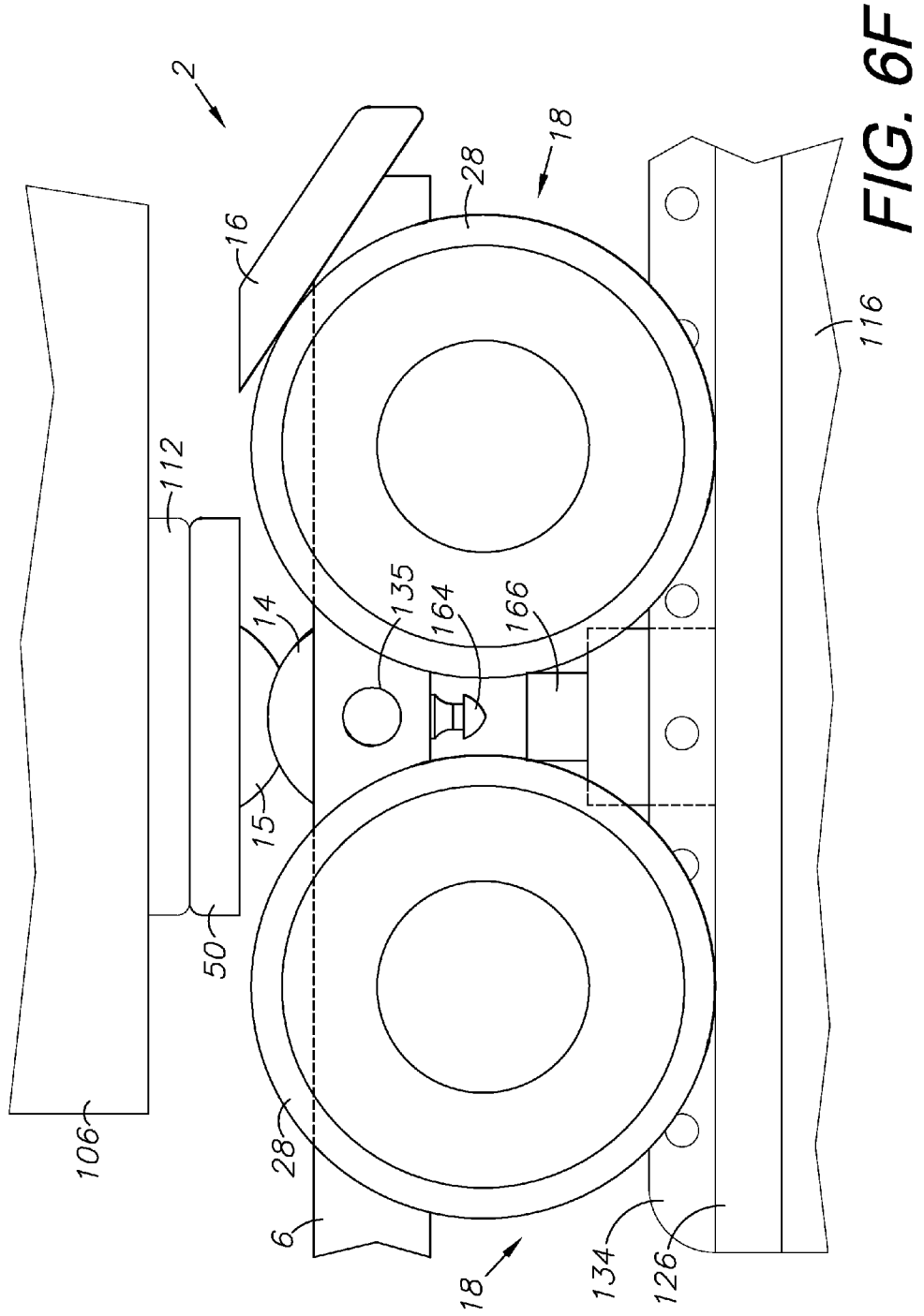
FIG. 6F is another alternative tie down mechanism.

FIG. 6F shows a first hitch component 164, which may include, but is not limited to a ball hitch or a beveled lug, and a second hitch component 166, such as a receiver. The hitch 164 is connected to the bottom of the frame 4 at a central location below the hitch component 50. The receiver 166 is hydraulically actuated and is extended up from the channel 130 of the railcar 116 into contact with the hitch 164 and locking the hitch 164 to the receiver 166. The receiver 166 is movable within the channel 130 enabling positioning of the receiver 166 along the length of the railcar 116, and laterally to permit proper positioning of the tie down device. All of the tie downs remain with the railcar 116 and are not permanently attached to the dolly 2. When in use, each tie down has one point of contact secured to the railcar 116, and a second point of contact releasably secured to the dolly 2.

III. First Alternative Embodiment Powered Converter Dolly 202

Figure 7:
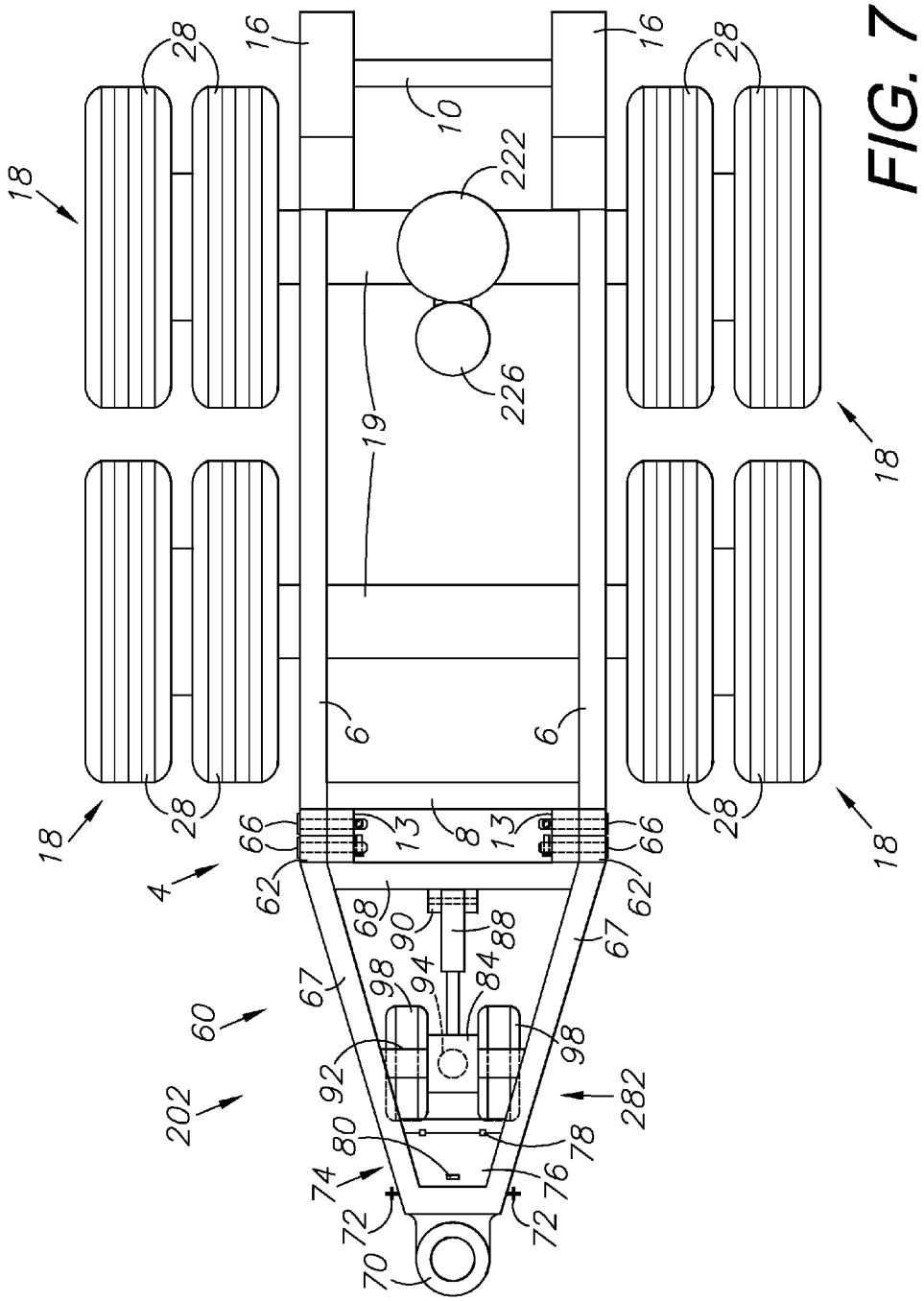
FIG. 7 is an alternative embodiment of a powered converter dolly embodying the principles of the disclosed subject matter where the wheels on the dolly axles are the powered drive wheels.

Reference numeral 202 generally designates an alternative embodiment powered converter dolly embodying the principles of the disclosed subject matter. Referring to FIG. 7, the dolly 202 is shown having a landing gear assembly 282 that is substantially similar to the landing gear assembly 82 described above except that it does not have a motor connected to the wheels 98. Instead, the movement of the dolly 202 is by way of a motor 226 and differential 222 operably connected to the axle 19 of one of the two axle assemblies 18. The motor 226 may be an electrical motor powered by the batteries 36 or generator 38, or may be a hydraulic motor powered by the hydraulic pump 44. Control of the motor 226 is by way of the aforementioned remote control 102. Movement and control of the dolly 2 and landing gear assembly 82 is as described above.

IV. Second Alternative Embodiment Powered Converter Dolly 302

Figure 8:
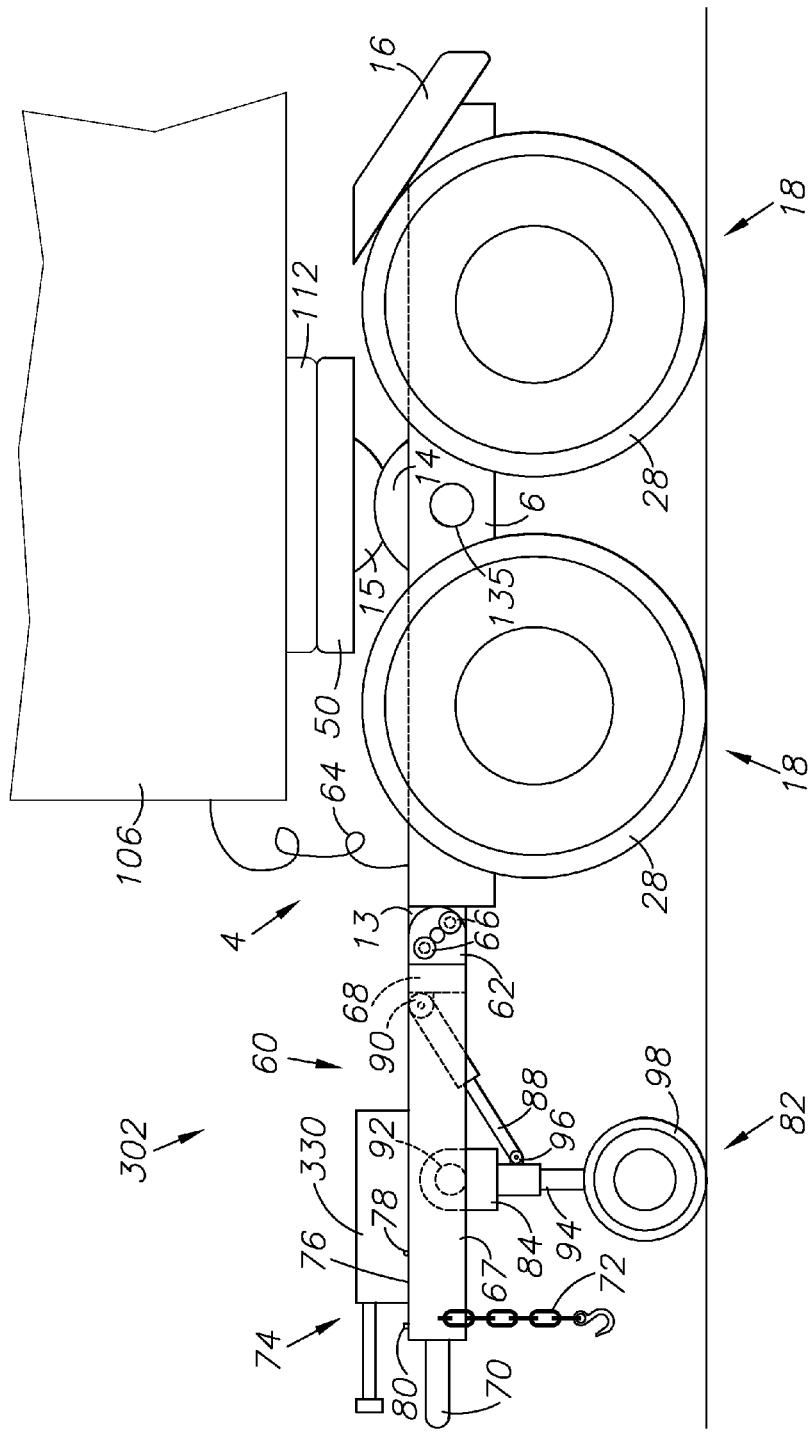
FIG. 8 is an alternative embodiment of a powered converter dolly embodying the principles of the disclosed subject matter where the drawbar has an extendable hydraulic jack.

Reference numeral 302 generally designates a second alternative embodiment powered converter dolly embodying the principles of the disclosed subject matter. Referring to FIG. 8, the dolly 302 is shown having a landing gear assembly 82 and a hydraulic ram 330 attached to the top of the drawbar assembly 60. The hydraulic ram 330 is powered by the hydraulic pump 44 and operated by the remote control 102. The hydraulic ram 330 is extended to engage a receiver on the bumper 108 of a lead-trailer 105, and retracted to draw the dolly 2 closer to a leading trailer 105 in order to align the ring coupling 70 with a coupling on the leading trailer's bumper. The hydraulic ram 330 may be used with or without the aid of the motors 226, 100 during this maneuver.

V. Third Alternative Embodiment Powered Converter Dolly 402

Figure 9:
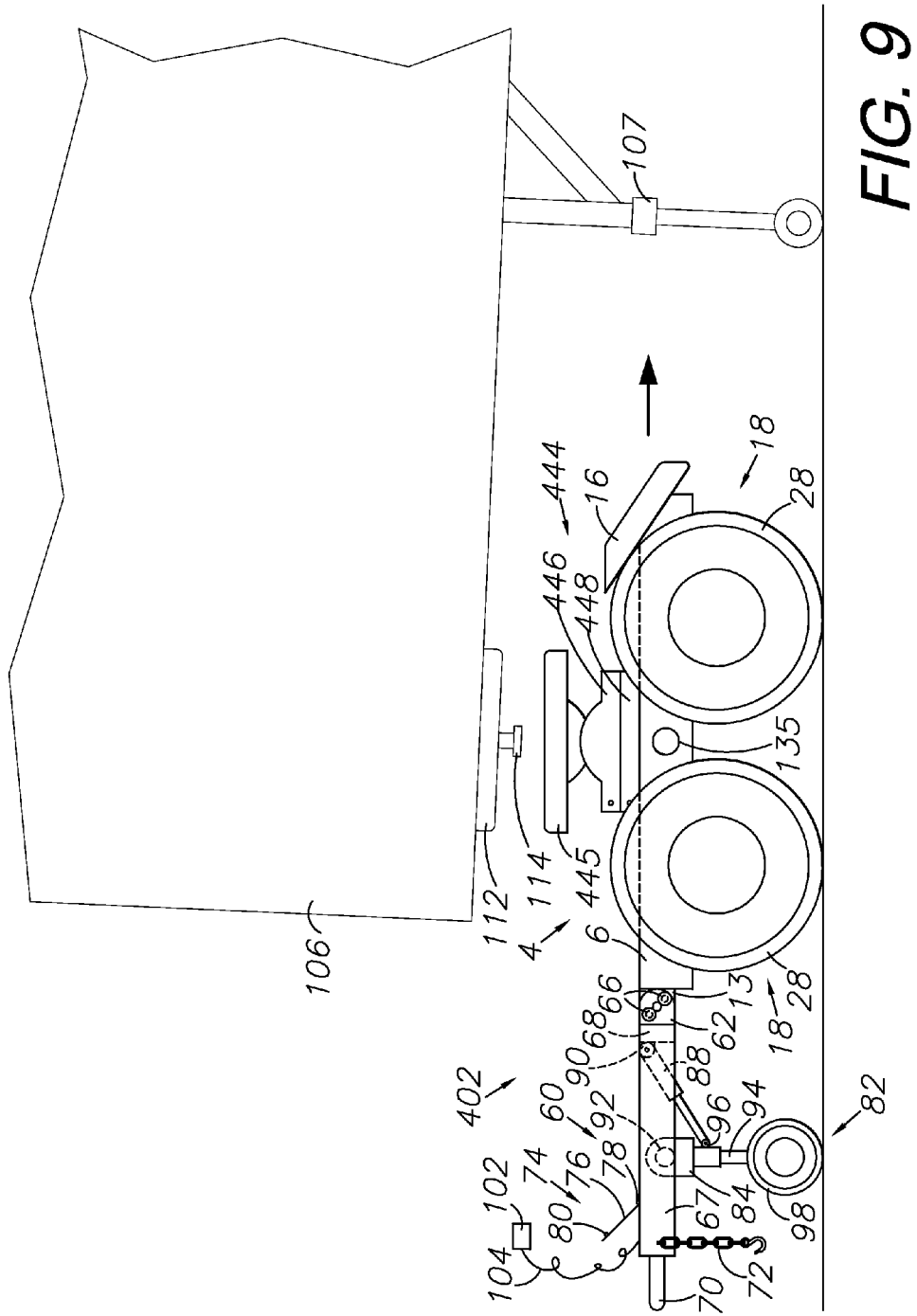
FIG. 9 is an alternative embodiment of a powered converter dolly embodying the principles of the disclosed subject matter where the fifth wheel is hydraulically actuated showing the dolly backing under a load-trailer.
Figure 10:
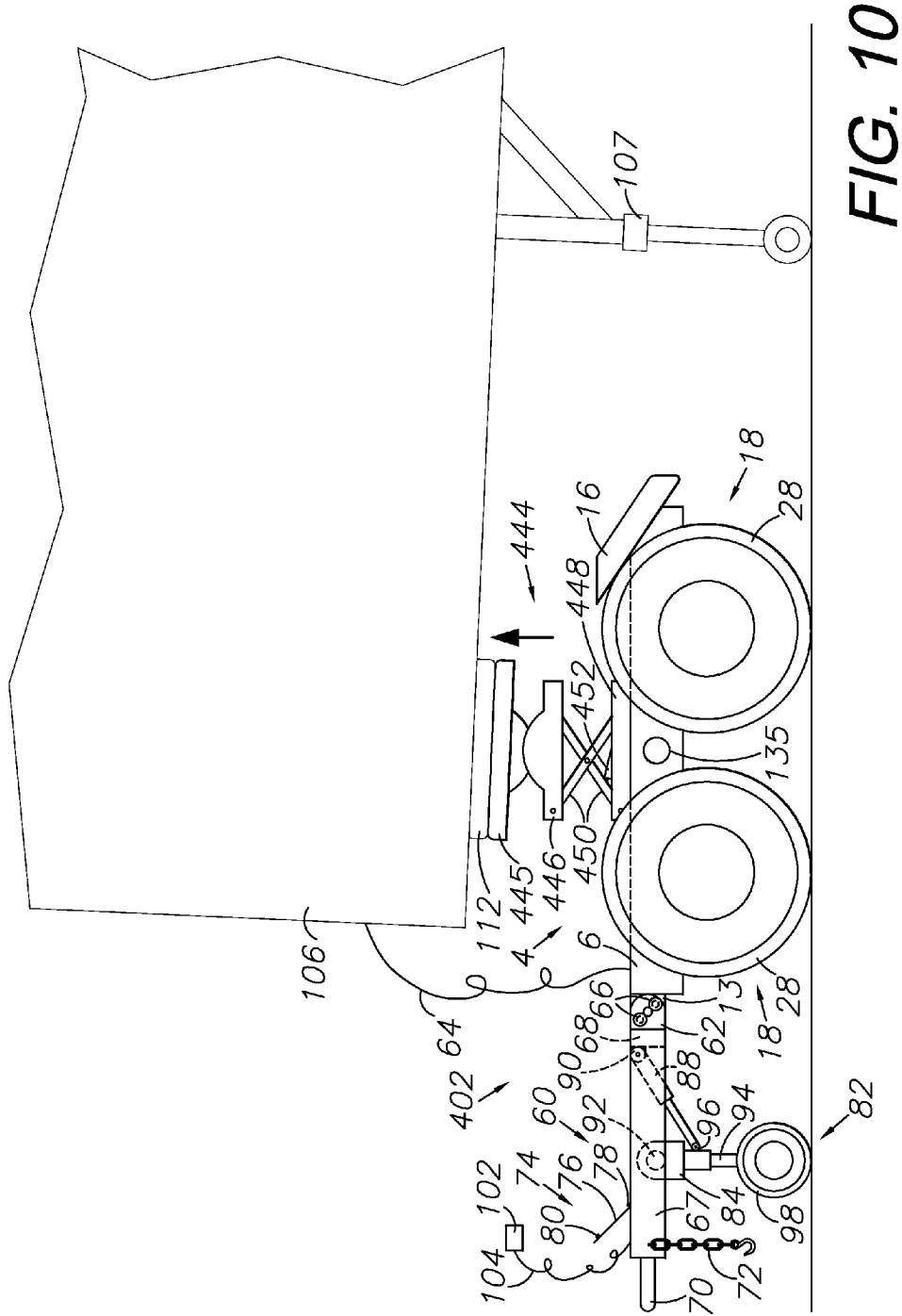
FIG. 10 is the dolly of FIG. 9 connecting to a trailer.
Figure 11:
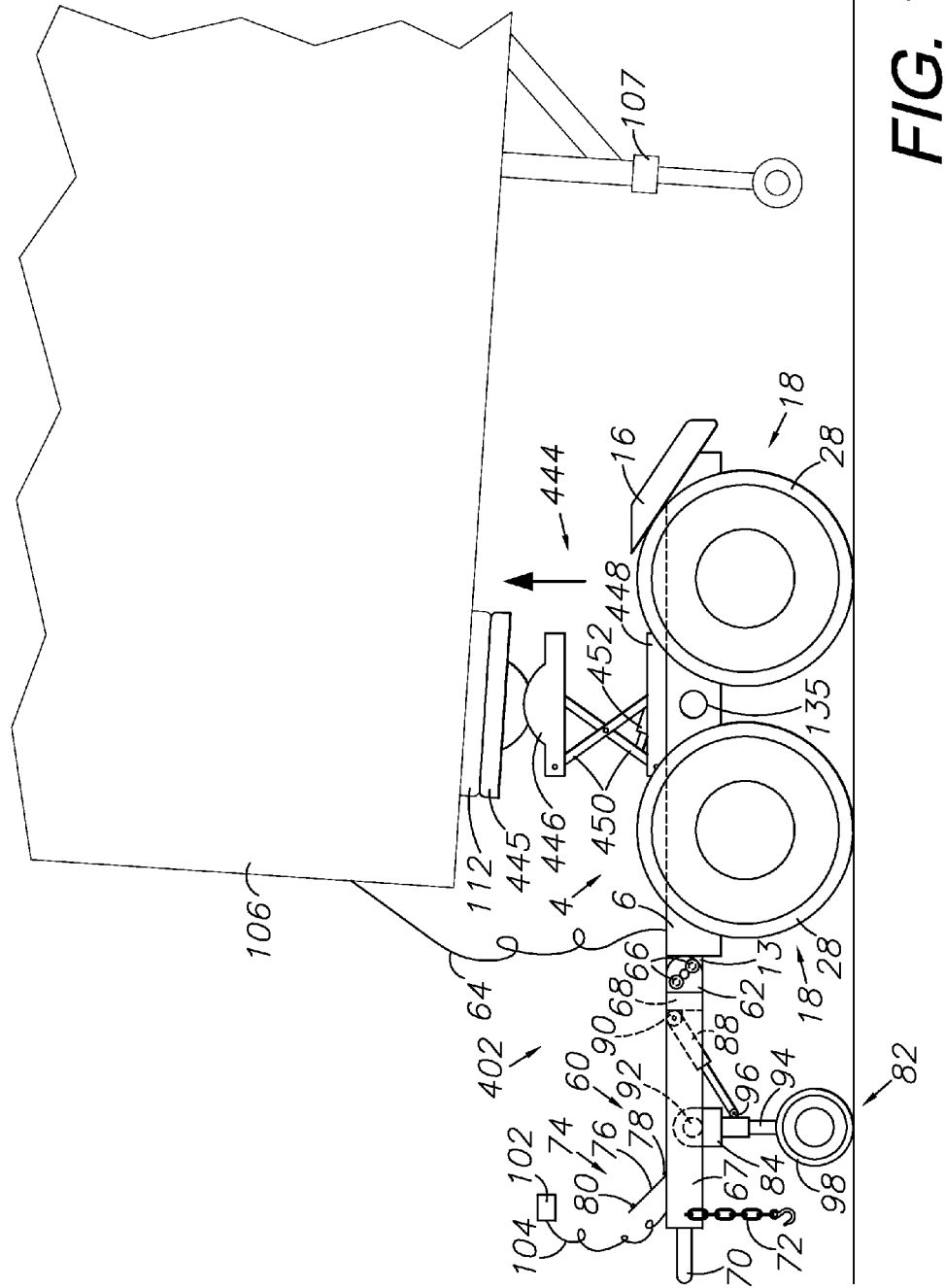
FIG. 11 is the dolly of FIG. 9 lifting a trailer for transport.

Reference numeral 402 generally designates a third alternative embodiment powered converter dolly embodying the principles of the disclosed subject matter. Referring to FIG. 9, the dolly 402 is shown with a hydraulic fifth wheel assembly 444 that allows an operator to move a trailer 106 without retracting the landing gear 107. The assembly 444 consists of a fifth wheel 445 pivotally attached to a top plate 446. The top plate 446 is attached to a bottom plate 448 by a pair of linked, folding support arms 450 arranged in a crisscross "X" pattern. An actuator 452, such as a hydraulic cylinder, provides pressure against an arm 450 to raise and lower the fifth wheel 445. The actuator 452 may be powered by the hydraulic pump 44 and operated by the remote control 102. In operation, the dolly 402 is powered up and backed under a trailer 106, using the remote control 102, aligning the fifth wheel 445 with the hitch component 114 and bearing plate 112 on the trailer 106. A supply line 64 is connected to the dolly 402 and the trailer 106 providing electrical power from the dolly 402 batteries 36 or generator 38 to the electrical system of the trailer 106, and providing pneumatic power from the air tank 32 to the trailer enabling the operator to control the engagement and disengagement of the trailer 106 air brakes with the remote control 102. After the trailer 106 air brakes have been engaged preventing the trailer 106 from rolling, the hydraulic fifth wheel assembly 444 is moved upward into contact with the bearing plate 112 (FIG. 10) lifting the trailer up off of the ground (FIG. 11) without having to retract the landing gear 107. Once the landing gear 107 are off of the ground, the operator can release the air brakes on the trailer 106 and may then move the trailer using the powered dolly 402. The trailer 106, with landing gear 107 extended, may be left in a target location by lowering the hydraulic fifth wheel assembly 444 and bringing the landing gear 107 into contact with the ground. Thereafter, the supply line 64 can be disconnected and the dolly 402 may be used for other duties.

VI. Fourth Alternative Embodiment Powered Converter Dolly 502

Referring to FIGS. 12-17E, the reference numeral 502 generally designates a fourth alternative embodiment powered converter dolly suitable for highway transportation embodying principles of the disclosed subject matter. The dolly 502 has many similarities to the dollies mentioned above. As such, the differences will be described below.

The dolly 502 generally consists of a rectangular frame 504 having a single axle assembly 18 depending therefrom, and mounting a hitch component 50 such as a fifth wheel. An integrated drawbar assembly 560 extends forward from the frame 504 and terminates at a ring coupling 70. A steerable landing gear assembly 82, as described above, is attached to the drawbar assembly 560.

Figure 12:
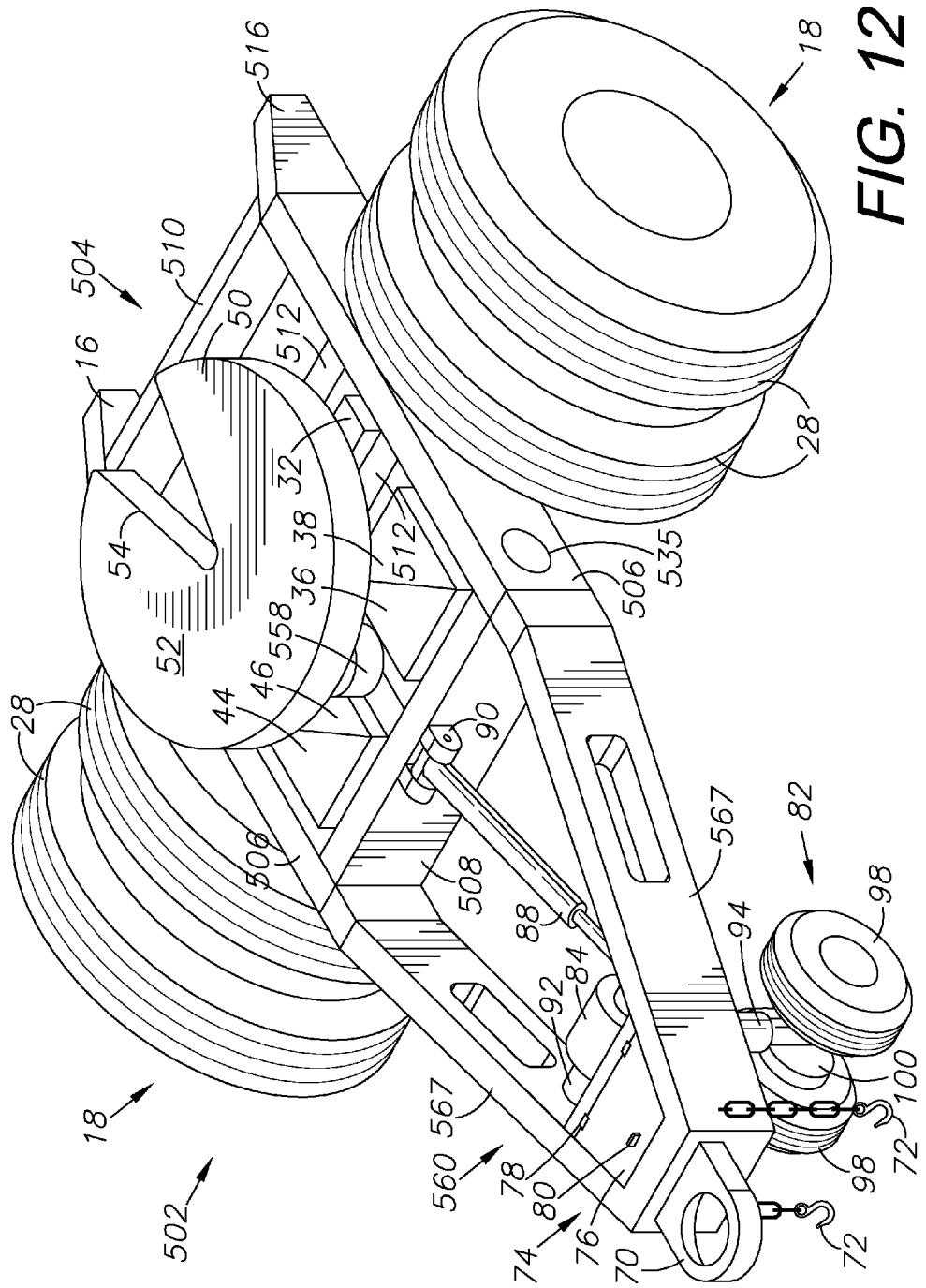
FIG. 12 is a perspective view of an alternative embodiment of a powered converter dolly embodying the principles of the disclosed subject matter where the drawbar is integrated with the dolly frame, and the wheels on the landing gear are the powered drive wheels.
Figure 13:
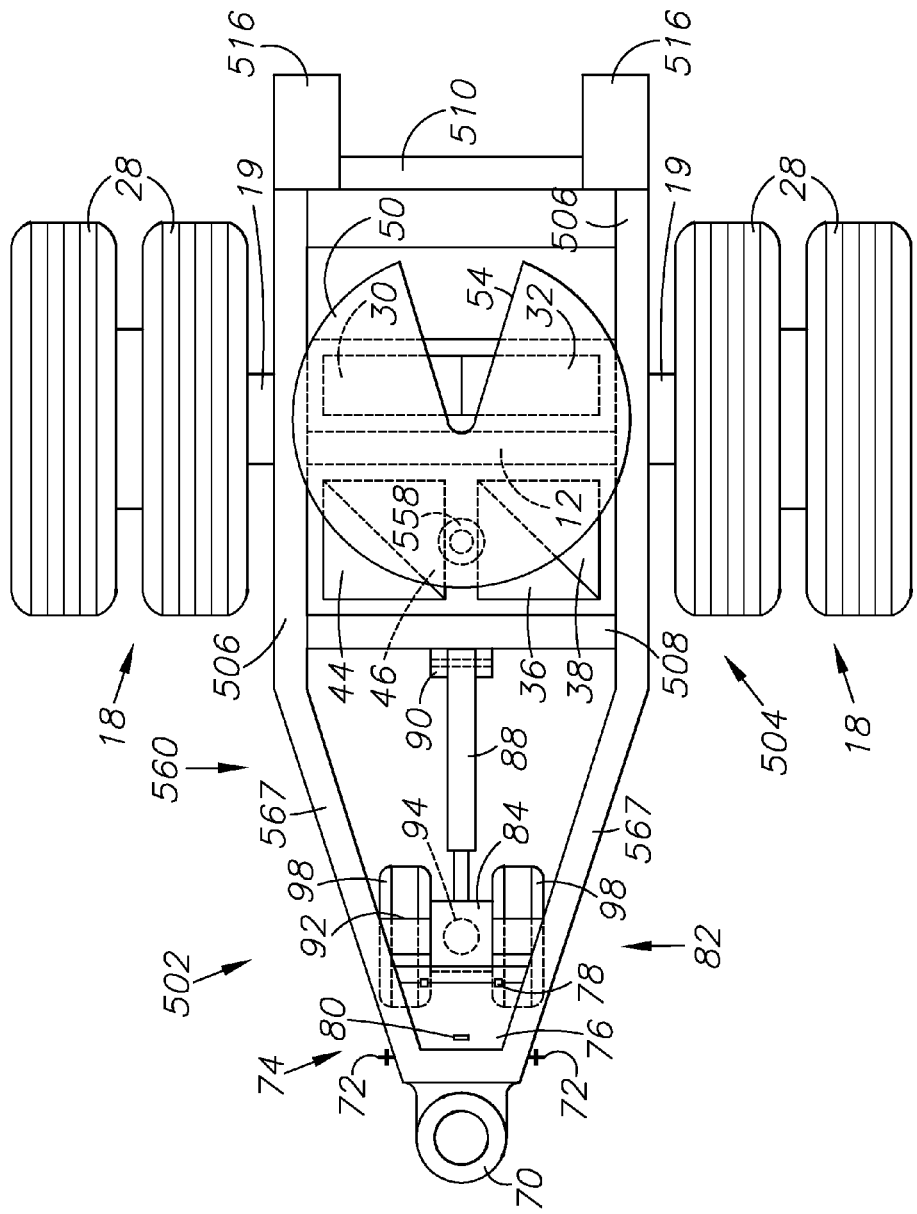
FIG. 13 is a plan view of the converter dolly of FIG. 12.
Figure 14:
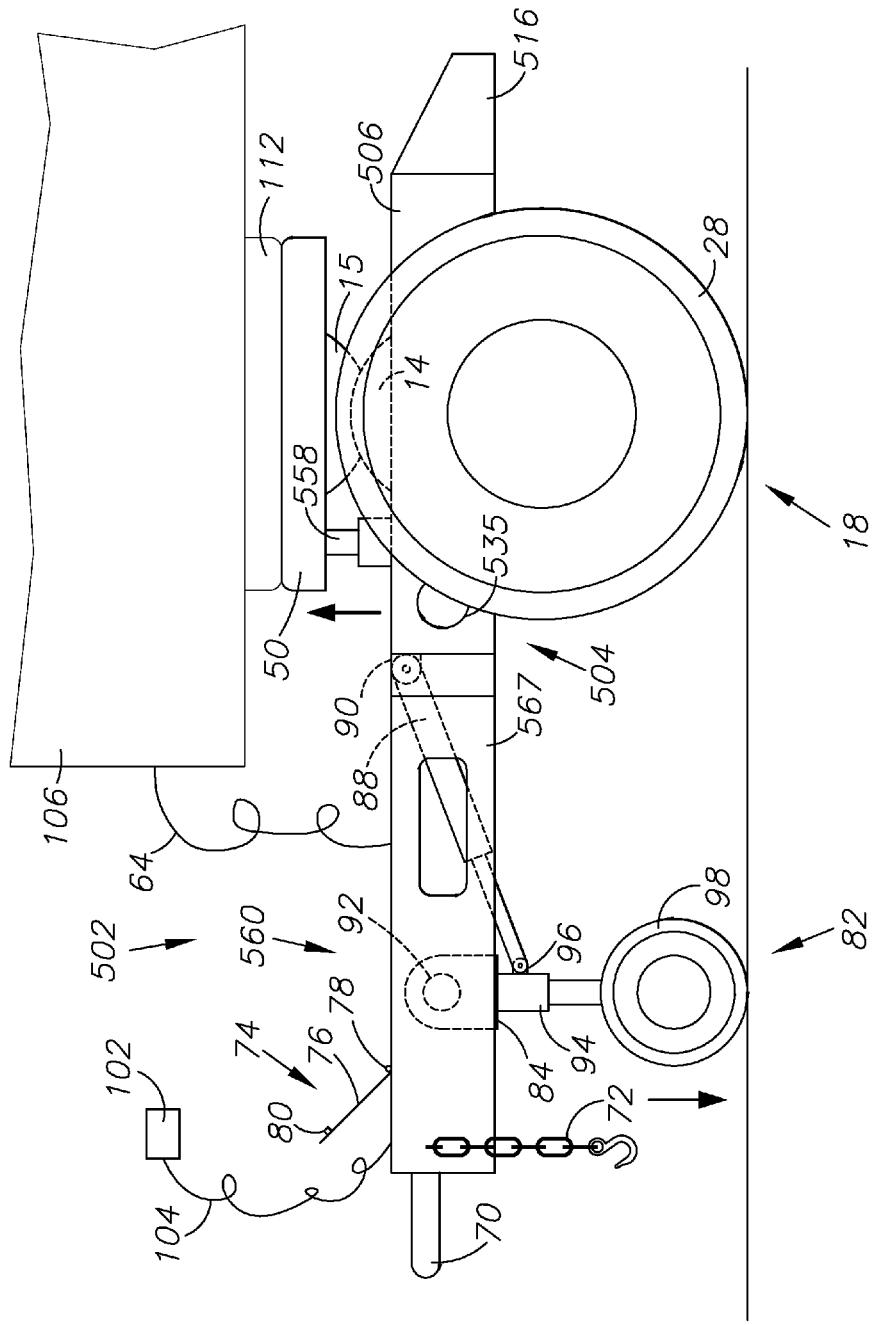
FIG. 14 is an elevation view of the converter dolly of FIG. 12 with the landing gear extended.

Referring to FIGS. 12-14, the dolly 502 is shown freestanding with the landing gear assembly 82 in an extended position with the wheels 98 engaging the ground. The dolly 502 frame 504 has opposite side rails 506, a front rail 508, a rear rail 510, and cross members 512. The frame 504 of the instant dolly 502 has only one axle assembly 18 depending therefrom including wheels 28 and air brakes. The dolly 502 includes a hitch component 50, as described above, that is attached to the frame 504 by brackets 14, 15. An actuator 558, located on the frame 504 below the front of the fifth wheel, is for adjusting the pitch of the fifth wheel, described in more detail below. The rear of the frame 504 may contain inclined ramps 516 for properly guiding a trailer 160 thereon.

The dolly 502 frame 504 and drawbar assembly 560 are manufactured from metal, preferably steel. The drawbar assembly 560 is generally triangular in configuration and has two side rails 567 that originate from the ends of the front rail 508, and extend forward terminating at a ring coupling 70.

The landing gear assembly 82 is the same as described above however, the rear of the actuator 88 is attached by a bracket 90 to the forward face of the front rail 508.

The instant dolly 502 is self-powered just as the dollies above, having the same power sources: a hydraulic pump 44 and reservoir 46; an electrical generator 38 and rechargeable batteries 36; and an air compressor 30 and air tank 32. Hydraulic, pneumatic, and electrical power are supplied to the same components for the same reasons as described above, including hydraulic, pneumatic, or electrical power to the actuator 58.

Referring to FIG. 14, the dolly 502 is shown connected to a load-trailer 106. Because the dolly 502 has only one axle assembly 18 to bear the weight of the load-trailer 106, the load-trailer 106 has a tendency to cause the front of the drawbar 560 to pitch up. Therefore, the actuator 558 is used to bias against the bottom of the fifth-wheel causing the landing gear assembly 82 to be pushed down toward the ground, in turn, bringing the wheels 98 into contact with the ground. The actuator 558 may be either a hydraulic cylinder, a pneumatic cylinder, or an electrical actuator, and is powered by the appropriate power source on the dolly 502. As the actuator 558 is extended, the wheels 98 are pushed into the ground with greater force permitting the wheels 98 to have enough traction on the ground to allow the landing gear assembly 82 to steer, or the motor 100 to move, the load-trailer 106. Control and operation of the actuator 558 and the mechanical components of the dolly 502 is via the remote control 102.

The remote control 102 in this embodiment is used and stored in the same manner as describe above.

The dolly 502 is prepared for use in maneuvering a trailer 106 by the operator using the remote control 102 to power up the dolly 502. The landing gear assembly 82 is rotated into position by extending the actuator 88. The operator engages the motor 100 rotating the wheels 98 and moving the dolly 502 in the direction the wheels 98 are pointing. The dolly 502 is maneuvered underneath the trailer 106 enabling engagement of the fifth wheel with the bearing plate 112. The air brakes on the dolly 502 are engaged and a supply line 64 is connected between the trailer 106 and dolly 502 providing an electrical and air connection between the dolly 502 and trailer 106 allowing the operator to engage and disengage the air brakes on the trailer 106 using the air tank 32 on the dolly 502. The operator then adjusts the actuator 558 to push the landing gear assembly 82 into the ground in order to give the wheels 98 enough fraction to effectively steer the trailer 106 and allow the motor 100 to rotate the wheels 98 for moving the load-trailer 106. Once the operator releases the air brakes on the load-trailer 106 and dolly 554, the motor 100 rotates the wheels 98 permitting the dolly 502 to maneuver the load-trailer 106 around for repositioning or to connect the dolly 502 and load-trailer 106 assembly to a lead-trailer 105. During movement, the dolly 502 and load-trailer 106 assembly can be stopped using either the air brakes on the dolly 502 or the load-trailer 106.

Figure 15:
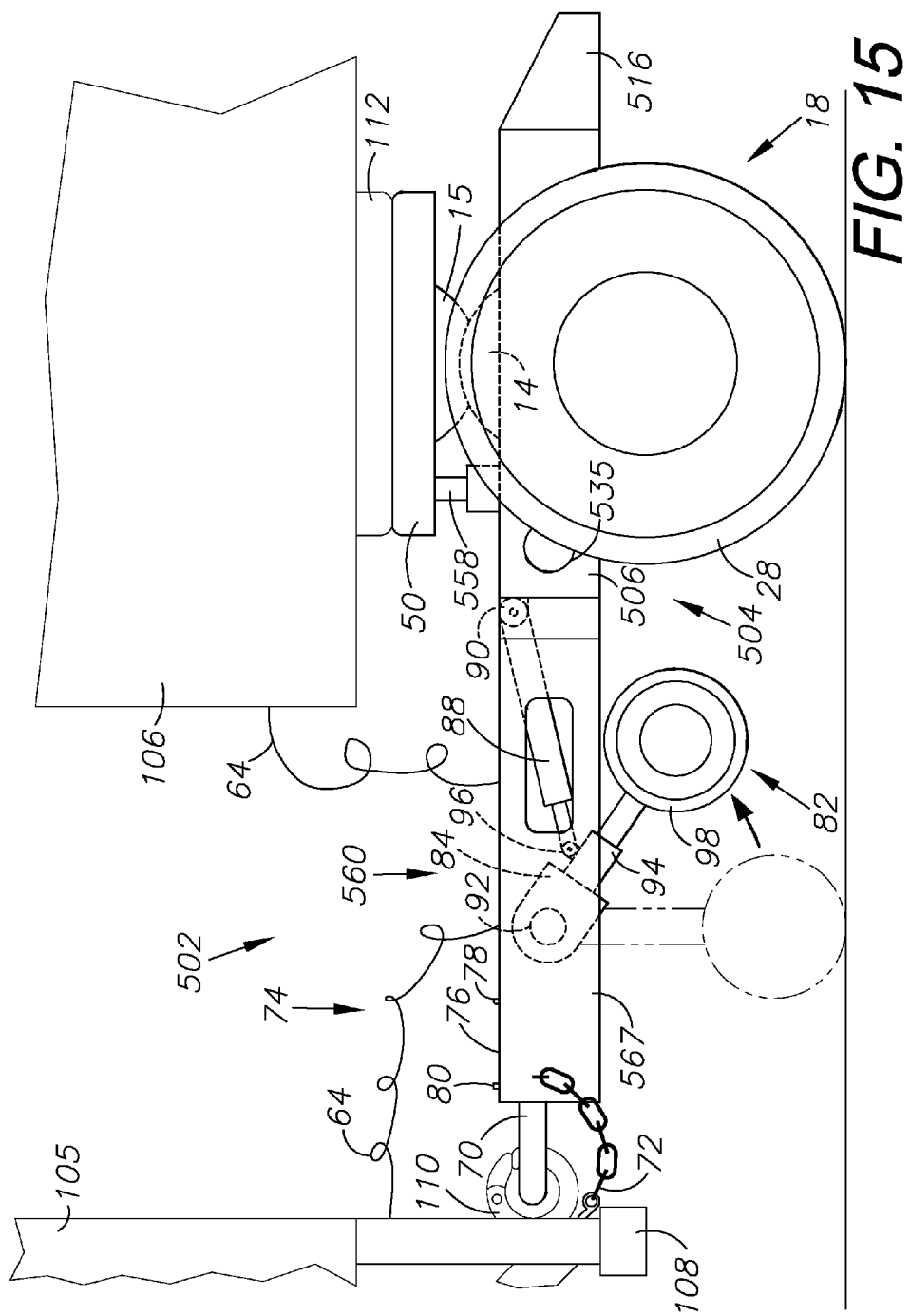
FIG. 15 is an elevational view of the converter dolly of FIG. 12 coupled to a load-trailer and a leading trailer, with the dolly landing gear retracted.

Referring to FIG. 15, the dolly 502 is shown connected to a lead-trailer 105 with the landing gear assembly 82 in the highway transportation position. The dolly 502 is attached to the lead-trailer 105 as described above. The ring coupling 70 is positioned at the right height by extending and retracting either the leg 94 or the actuator 558. A supply line 64 is connected between the lead-trailer 105 and the dolly 502 as described above. The landing gear assembly 82 is moved into highway transportation position by retracting the actuator 88 until the wheels 98 are underneath the rear of the drawbar assembly 560. The actuator 558 is retracted sufficiently to permit the fifth wheel to pitch forward and backward as needed when the dolly 502 is traveling over the roadway. Disengaging the dolly 502 from the lead-trailer 105 is accomplished by following the steps above in reverse. The remote control 102 is returned to the storage box 74 during highway transportation. As above, the lead-trailer 105 can recharge the rechargeable batteries 36 between uses.

Figure 16:
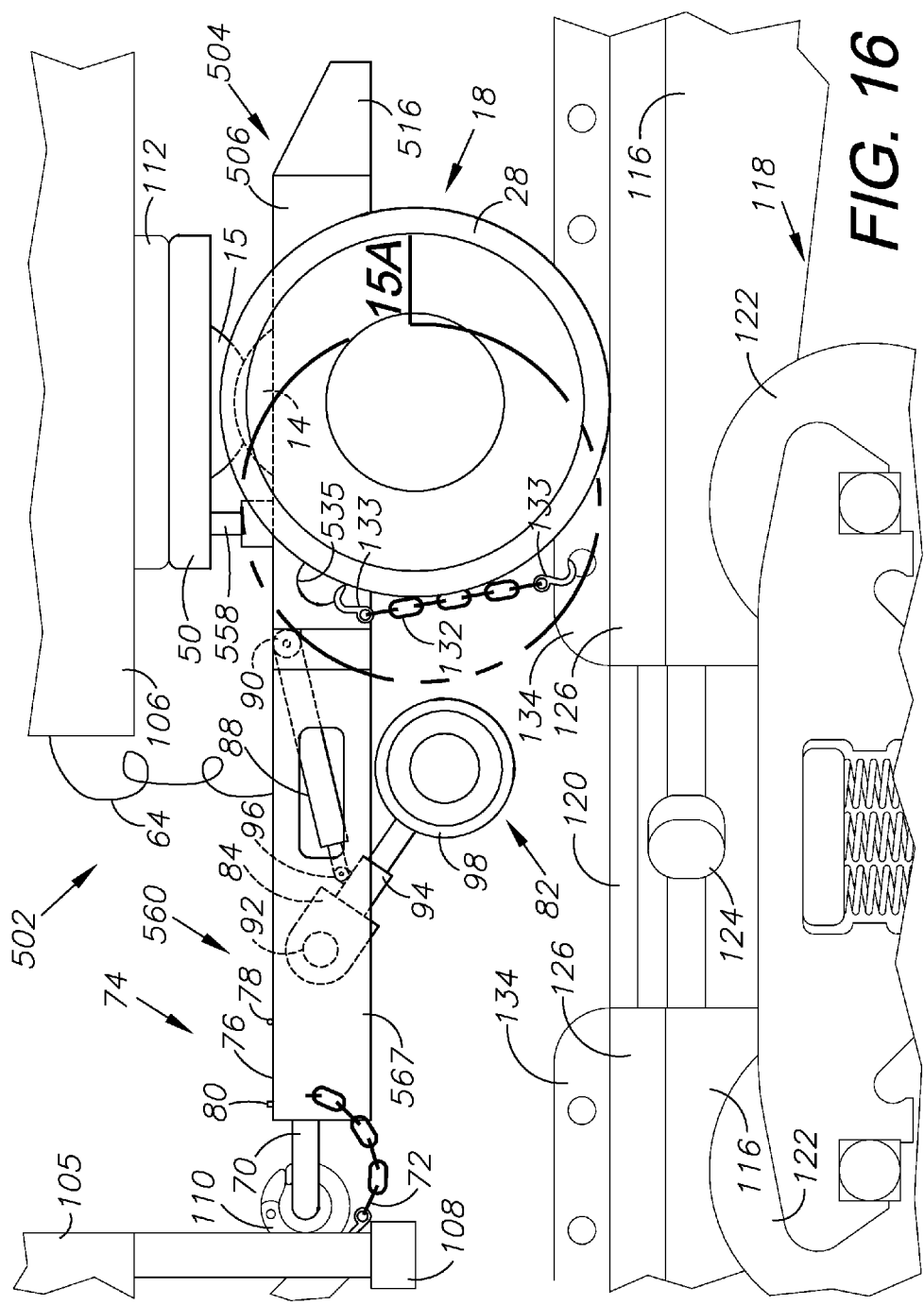
FIG. 16 is an elevation view of the converter dolly of FIG. 15 attached to an intermodal railroad flatcar.
Figure 17A:
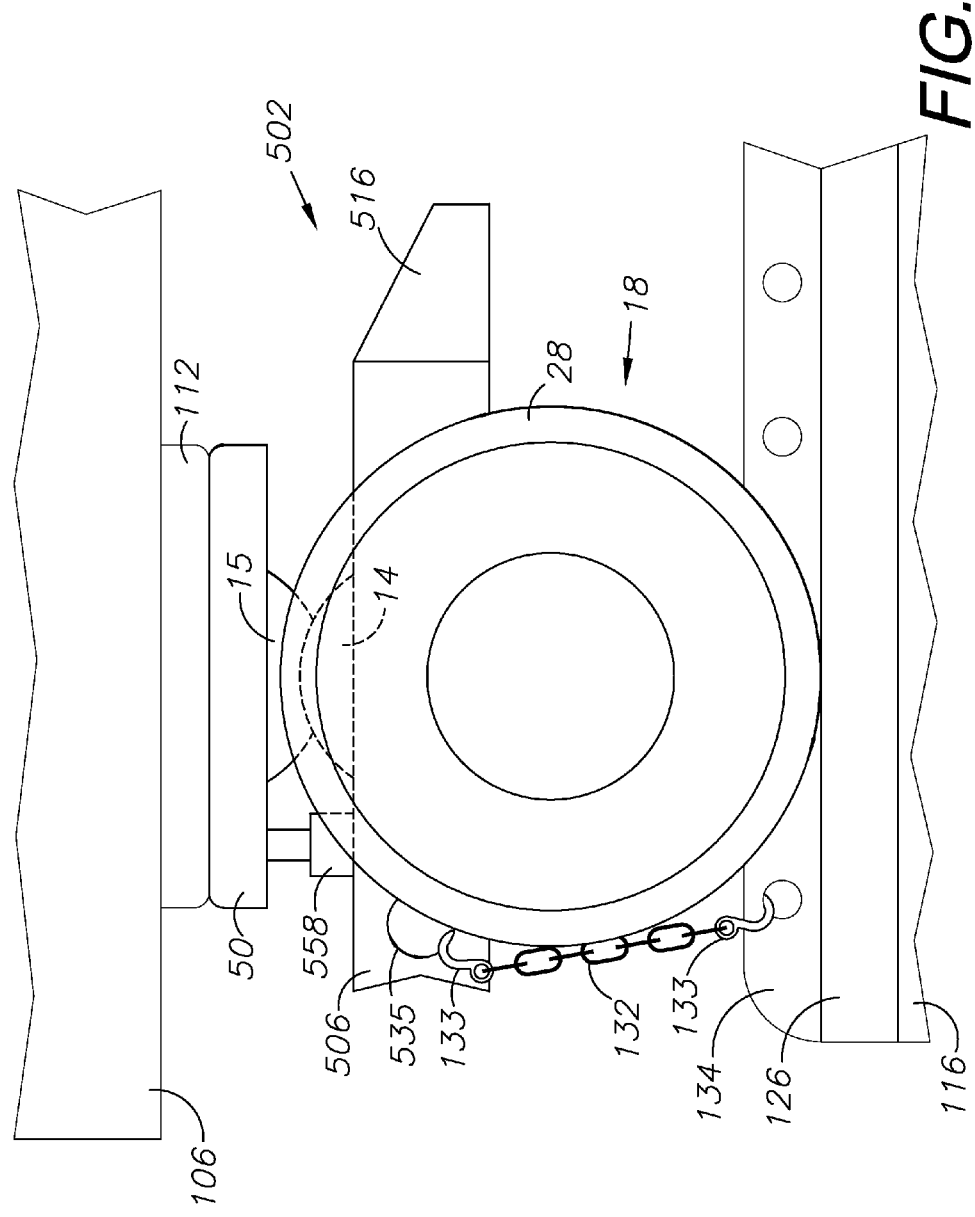
FIG. 17A is an enlarged elevational view of the tie down mechanism taken generally within circle 15A in FIG. 16.
Figure 17C:
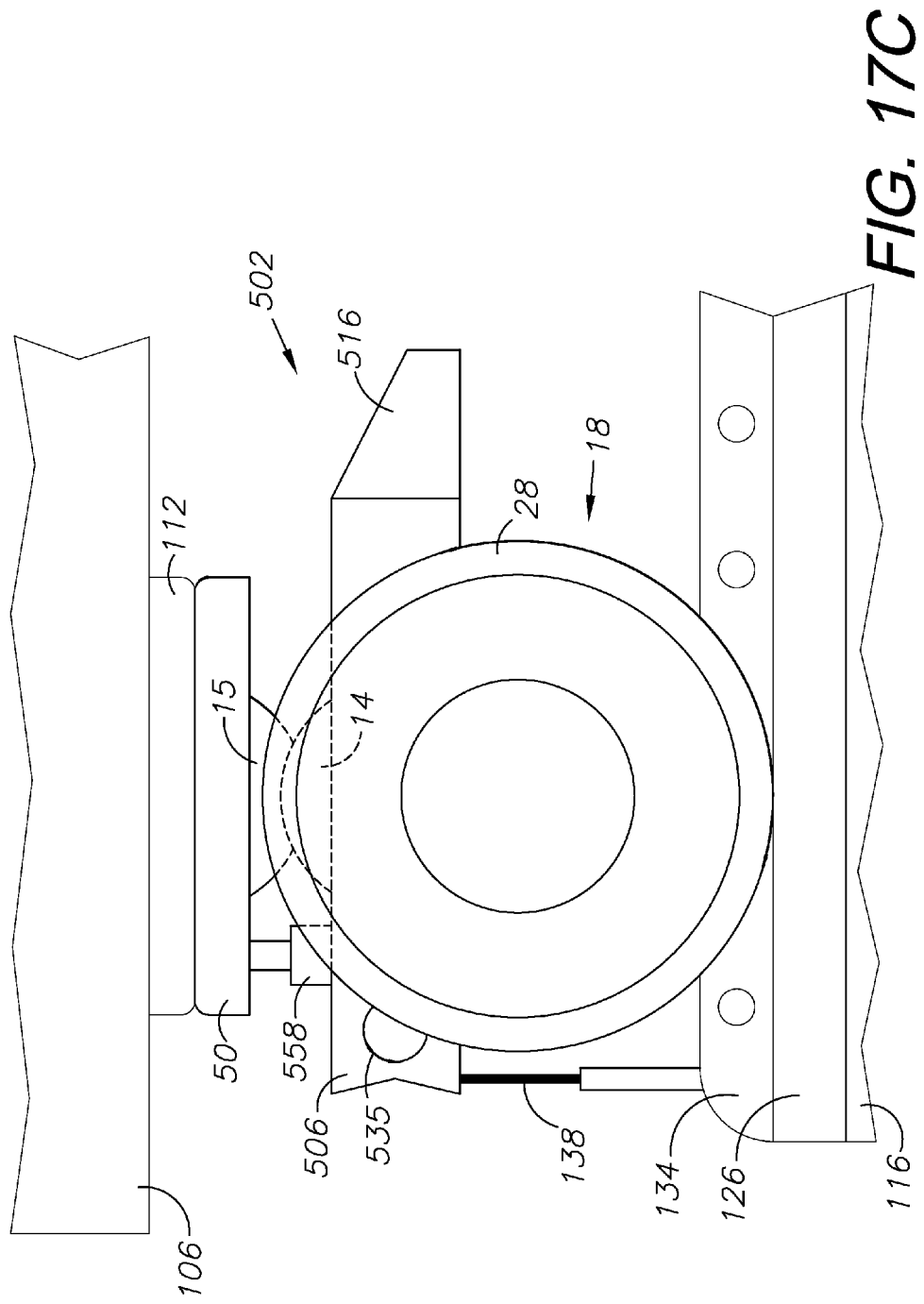
FIG. 17C is another alternative tie down mechanism.
Figure 17E:
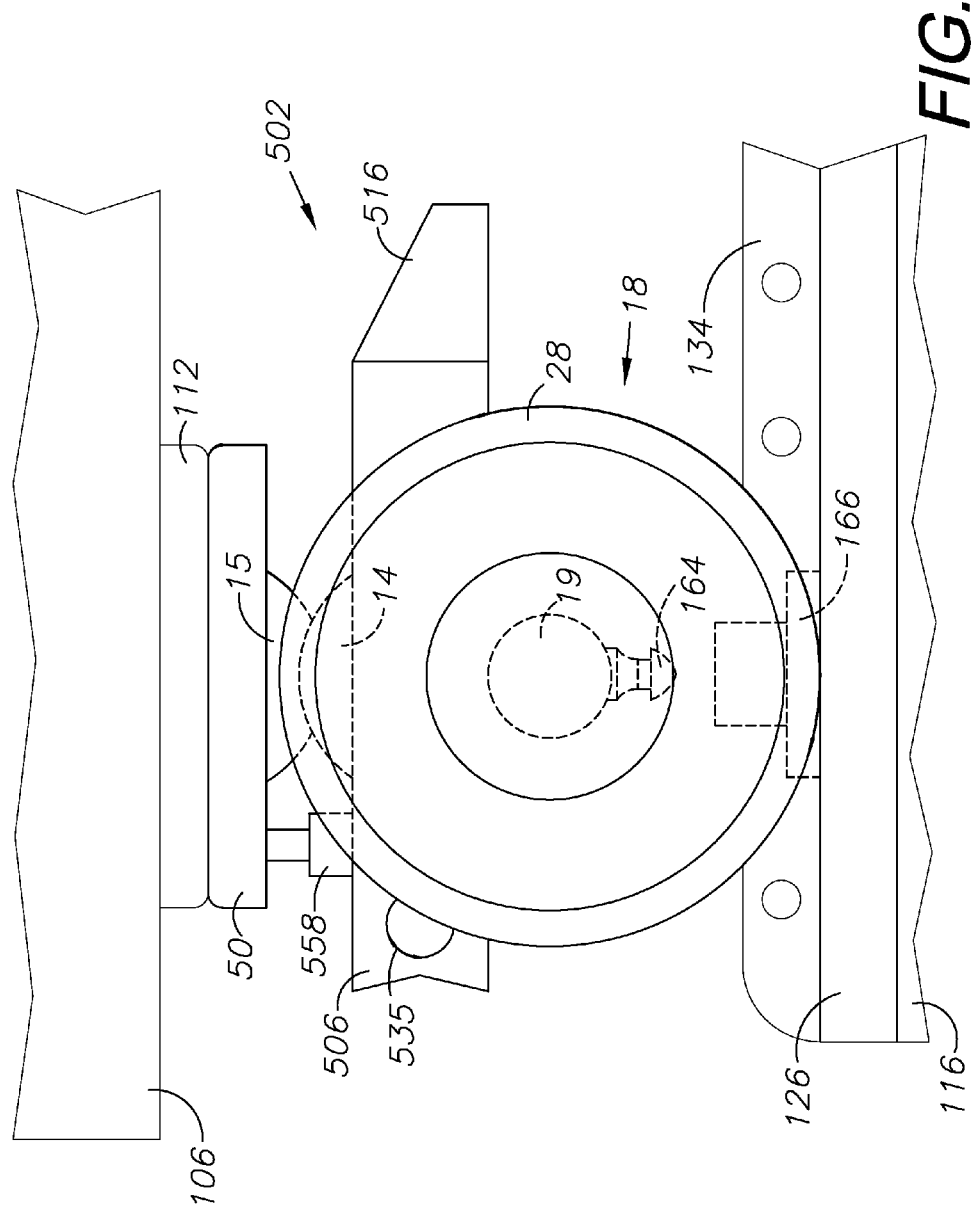
FIG. 17E is another alternative tie down mechanism.

Referring to FIG. 16, the dolly 502 is shown in the highway transportation position attached to a lead-trailer 105 and a load-trailer 106 on an intermodal railway flatcar 116. The railway flatcar 116 and its assorted components are as described above. The dolly 502 is shown secured to the railcar 116 by a tie down, such as a chain 132. As above, the tie downs attach to the dolly 502 at one or more attachment points such as a lashing ring, mounting ring, or an aperture 535 in the frame 504, and remain with the railway flatcar 116 when not connected to the dolly 502. FIGS. 17A-17E shown alternative types of tie downs that may be used including a mechanical tie-down, such as a ratchet load binder 136, a hydraulic tie down, such as a hydraulic cylinder 138, an electrical tie down, such as an electrical winch 140 and cable 141, and a hitch 164 attached to the axle 19 of the axle assembly 18 and receiver 166, each of which operate as described above. The aforementioned tie downs operate in the same manner as described in FIGS. 6A-6F described above.

VII. Fifth Alternative Embodiment Powered Converter Dolly 602

Figure 18:
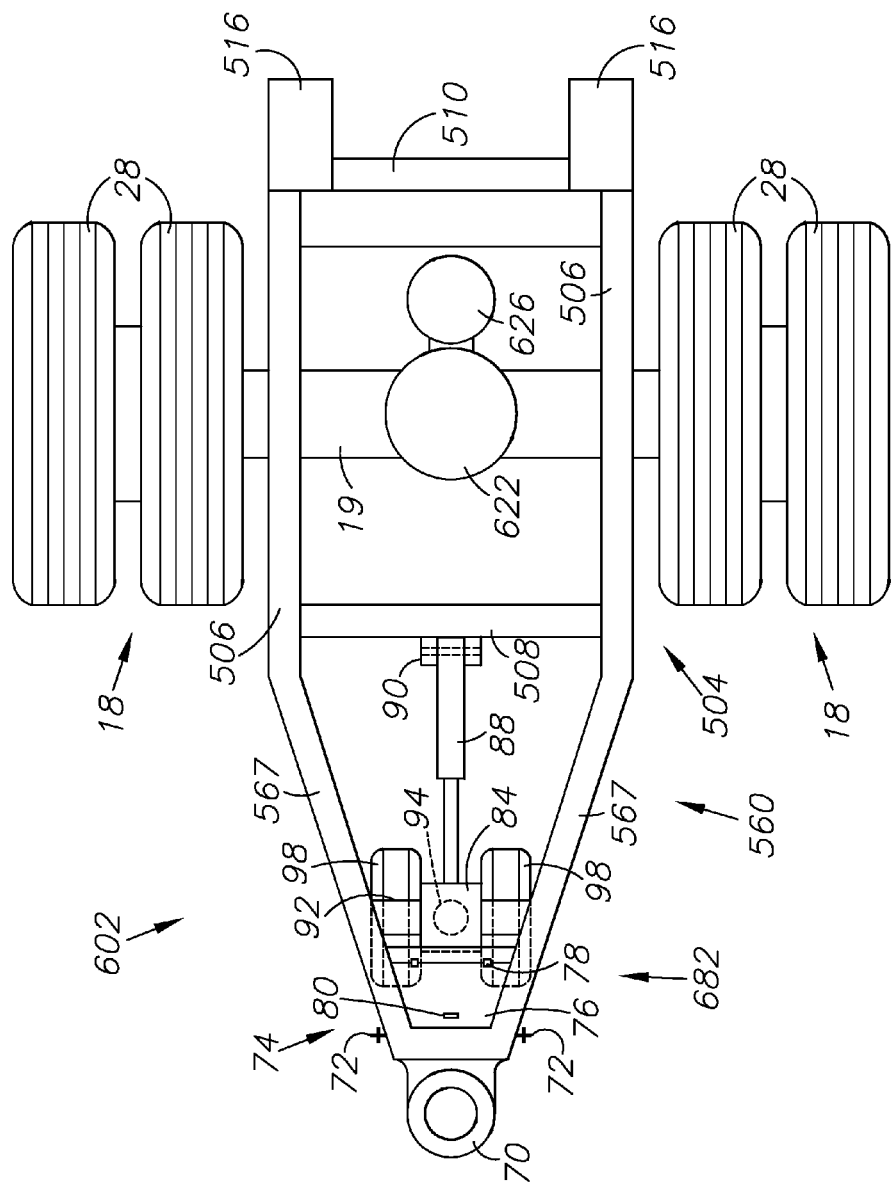
FIG. 18 is an alternative embodiment of a powered converter dolly embodying the principles of the disclosed subject matter where the wheels on the dolly axle are the powered drive wheels.

Reference numeral 602 generally designates a fifth alternative embodiment powered converter dolly embodying the principles of the disclosed subject matter. Referring to FIG. 18, the dolly 602 is shown having a landing gear assembly 682 that does not have a motor connected to the wheels 98 but has movement by way of a motor 626 and differential 622 operably connected to the axle 19 of the axle assembly 18. The motor 626 and differential 622 are of the type, and operate in the same manner, as described above.

VIII. Sixth Alternative Embodiment Powered Converter Dolly 702

Figure 19:
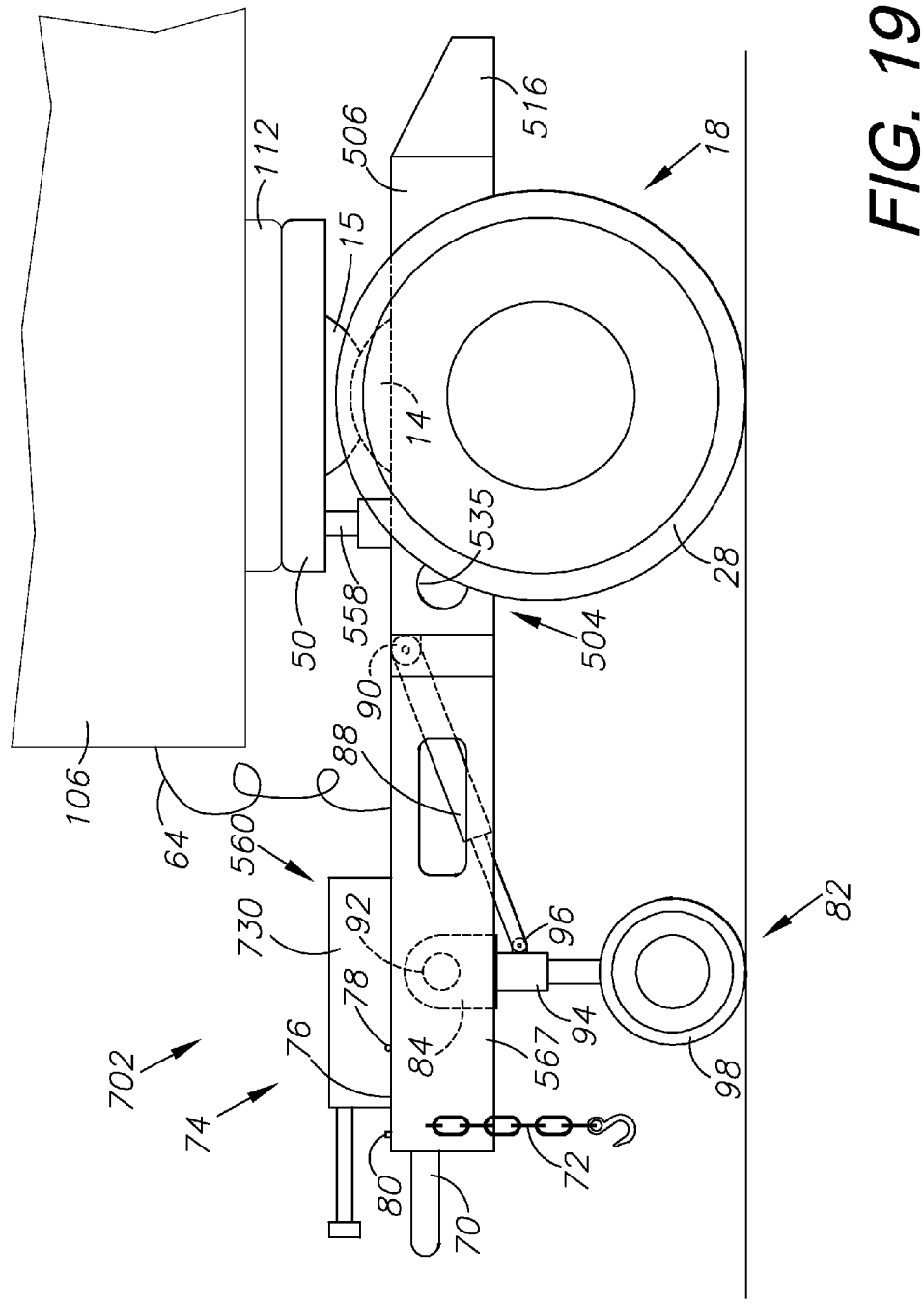
FIG. 19 is an alternative embodiment of a powered converter dolly embodying the principles of the disclosed subject matter where the drawbar has an extendable hydraulic jack.
Figure 20:
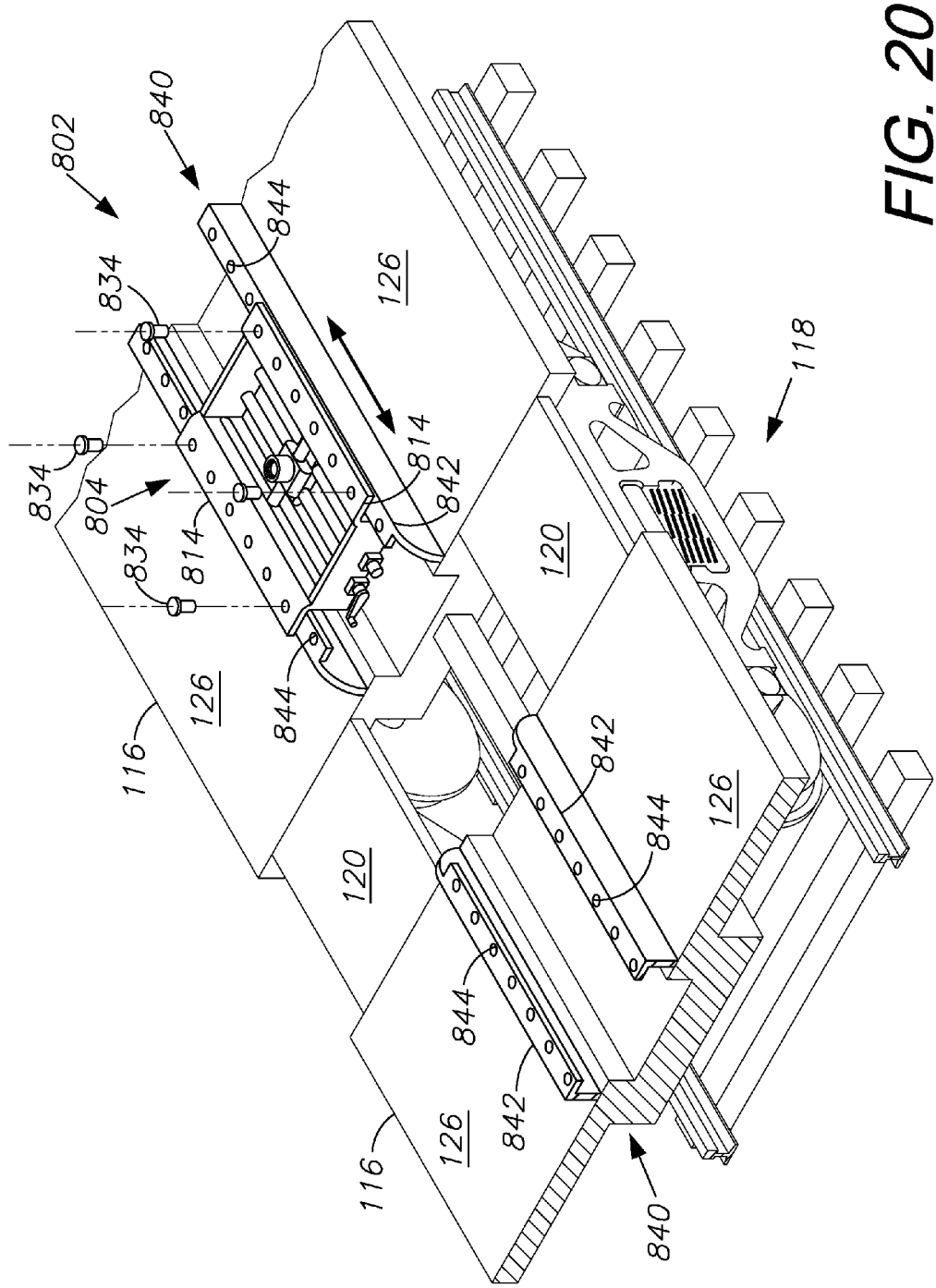
FIG. 20 is a perspective view of the trolley system mounted on a railcar embodying principles of the disclosed subject matter.

Reference numeral 702 generally designates a sixth alternative embodiment powered converter dolly embodying the principles of the disclosed subject matter. Referring to FIG. 19, the dolly 702 is shown having a landing gear assembly 82 and a hydraulic ram 730 attached to the top of the drawbar assembly 560. The hydraulic ram 730 is of the same type, and operates in the same manner, as the hydraulic ram 330 described above.

It will be appreciated that the components of the dollies 2, 202, 302, 402, 502, 602, and 702 may be used for various other applications. Moreover, the dollies may be fabricated in various sizes and from a wide range of suitable materials, using various manufacturing and fabrication techniques.

IX. Embodiment of the Trolley System 802

Reference numeral 802 generally designates a trolley system embodying the principles of the disclosed subject matter. Referring to FIGS. 20-27, the trolley system 802 is shown and described. In particular, the trolley system 802 has a trolley 804 movable on a railcar 116 within a trolley guide 840, and has a hitch component 822 movable within a frame 806. The hitch component 822 is selectively interconnectable with a hitch component 864 attached to an object including, but not limited to a dolly 2, 202, 302, 402, 502, 602, and 702, a trailer 105, 106, a fifth wheel stand 952, a connector ring 1062, or a tractor 1086.

Figure 21:
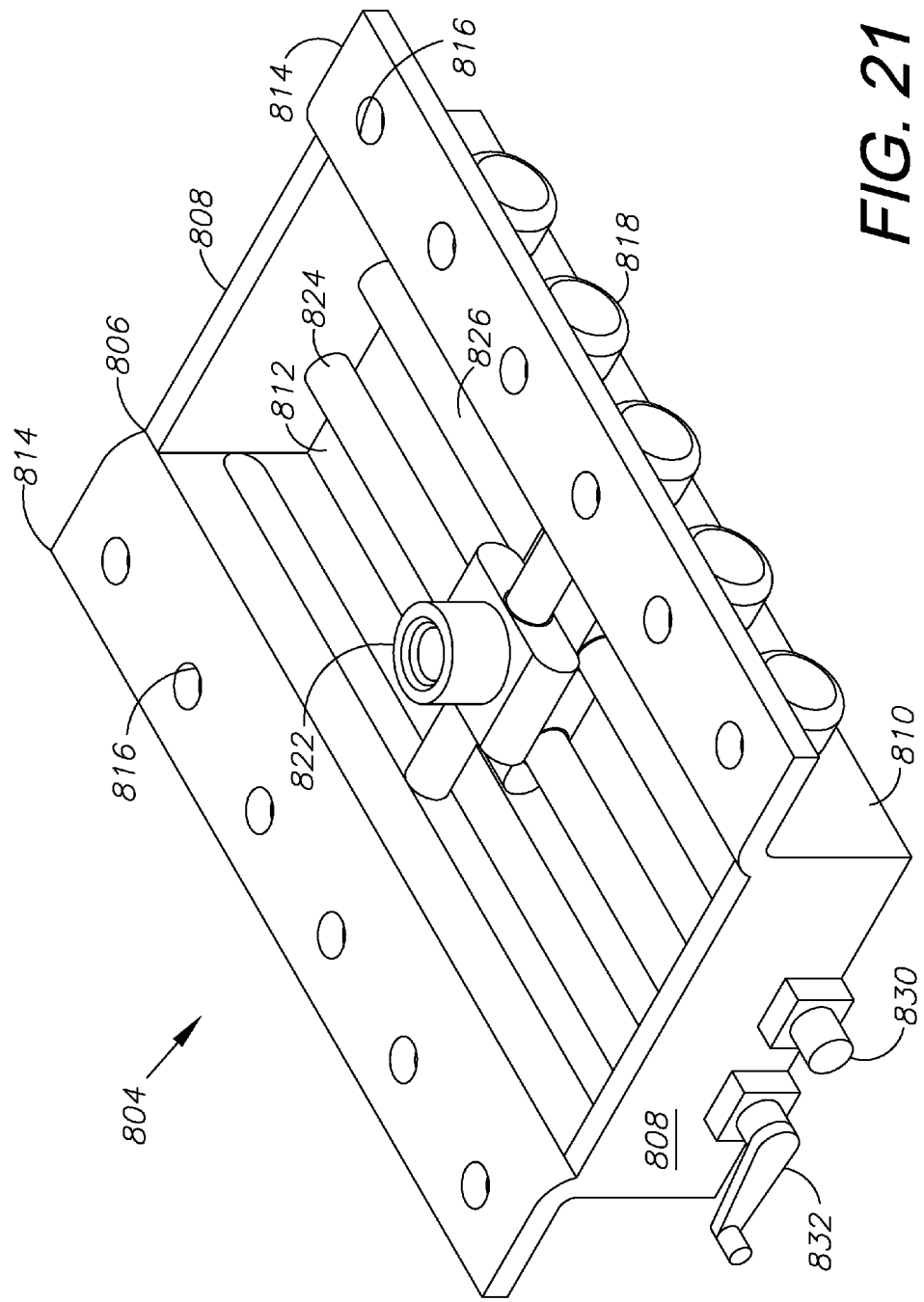
FIG. 21 is a perspective view of the trolley of FIG. 20.

Referring to FIG. 21, the trolley 804 generally consists of a frame 806 having an interior and an exterior whereby the interior is bounded by opposite end walls 808, side walls 810, and a bottom wall 812. A flange 814 extends laterally from each side wall 810 overlapping a channel 842 of the trolley guide 840. The flange 814 has a plurality of equally spaced receivers 816 that align with receivers 844 in the trolley guide 840. The receivers 816, 844 are adapted for receiving a locking member such as an elongated pin 834. A plurality of equally spaced wheels 818 are on the exterior of each side wall 810, and are adapted for rolling within the channel 842.

The hitch component 822 may be selectively positioned at any point along the length or width of the trolley 804 using one or more horizontal actuators. The horizontal actuators may be a longitudinal actuator 824 or a transverse actuator 826. The hitch component 822 may be positioned along the length of the trolley 804 by adjusting the longitudinal actuator 824. The actuator 824 may be operated using an arm crank 832 located at one end wall 808 of the trolley 804, or by engaging a motor 830 located at the opposite end wall 808. The hitch component 822 may be positioned at any point along the width of the trolley 804 by adjusting the transverse actuator 826. The actuator 826 operates by engaging a motor 830 located at one end wall 808 of the trolley 804, or by using an arm crank 832 located at the opposite end wall 808. The arm cranks 832 and motors 830 may be locked down or locked-out to prevent unwanted movement of the hitch component 822. The motor 830 may be a hydraulic, pneumatic, or electric motor powered by a complimentary power source.

Alternatively, the actuators 824, 826 that move the hitch component 822 may be a roller pinion system such as the type manufactured by Nexen Group, Inc. of Vadnais Heights, Minn.

The hitch component 822 selectively interconnects with a second hitch component, such as a hitch 864. The hitch component 822 is adapted to receive the hitch 864 and lock the two securely together using conventional locking devices known in the hitch industry. The hitch component 822 may include, but is not limited to a circular receiver having a bell-shaped opening. The hitch 864 may include, but is not limited to a king pin or a cylindrical object such as a ball hitch or a beveled lug.

Referring to FIGS. 22-27, the trolley 804 is shown connected to dollies 2 and trailers 106 mounted on railcars 116. Although the trolley 804 is shown connected to a dual-axle dolly 2, use of a dual-axle dolly 2 is intended to be exemplary and does not limit the scope of suitable dollies that may be used with the trolley system 802. Therefore, the trolley 804 may be used with the dollies 2, 202, 302, 402, 502, 602, and 702 described above, or other types of multi-axle dollies. Referring to FIGS. 22 and 23, the trolley 804 is shown connected to a dual-axle dolly 2, and secured to one railcar 116. The trolley 804 attaches to the dolly 2 by connecting the hitch component 822 to a hitch 864. The hitch 864 may be generally located below the hitch component 50 and connected to the frame 4 by a mount 862. Once the dolly 2 and trailer 106 are positioned on top of the railcar 116, the trolley 804 is moved along the length of the railcar 116 within the trolley guide 840 to position the interior of the trolley 804 generally underneath the hitch 864. The receivers 816, 844 are aligned on at least one railcar 116. In the particular application depicted in FIG. 23, because the location of the hitch 864 is so close to the gap between two separate railcars 116, the trolley 804 spans the gap. The multitude of wheels 818 on the trolley 804 enable it to remain in contact with at least one railcar 116 when in use, even when spanning two railcars 116. After generally positioning the trolley 804, at least one pair of locking members 834 are inserted into the receivers 816, 844 on either end of the trolley 804 to create a secure connection between the trolley 804 and the railcar 116. The hitch component 822 is then positioned below the hitch 864 by adjusting the longitudinal actuator 824 and the transverse actuator 826. When the hitch component 822 and hitch 864 align, the hitch component 822 is raised into engagement with the hitch 864 by the height actuator 828 securing the dolly 2 to the railcar 116. The height actuator 828 is powered by a complimentary power source and may include, but is not limited to a hydraulic or pneumatic piston and cylinder unit, a scissor lift, a screw-type actuator such as the RACO screw electric actuator manufactured by RACO International, LP of Bethel Park, Pa., or an assembled columnar actuator such as the I-Lock Spiralift manufactured by PACO Spiralift, Inc. of Quebec, Canada. When the dolly 2 and trailer 106 are ready to be removed from the railcar 116, the hitch component 822 and hitch 864 are disengaged and the hitch component 822 is retracted back into the trolley 804 so it does not obstruct passage of the dolly 2 or trailer 106 above, or contact any obstructions depending therefrom such as a hitch 864. The trolley 804 may be repositioned by removing the locking members 834 and moving the trolley 804 along the length of the railcar 116. The trolley 804 may remain with the railcar 116 when not in use.

Figure 24:
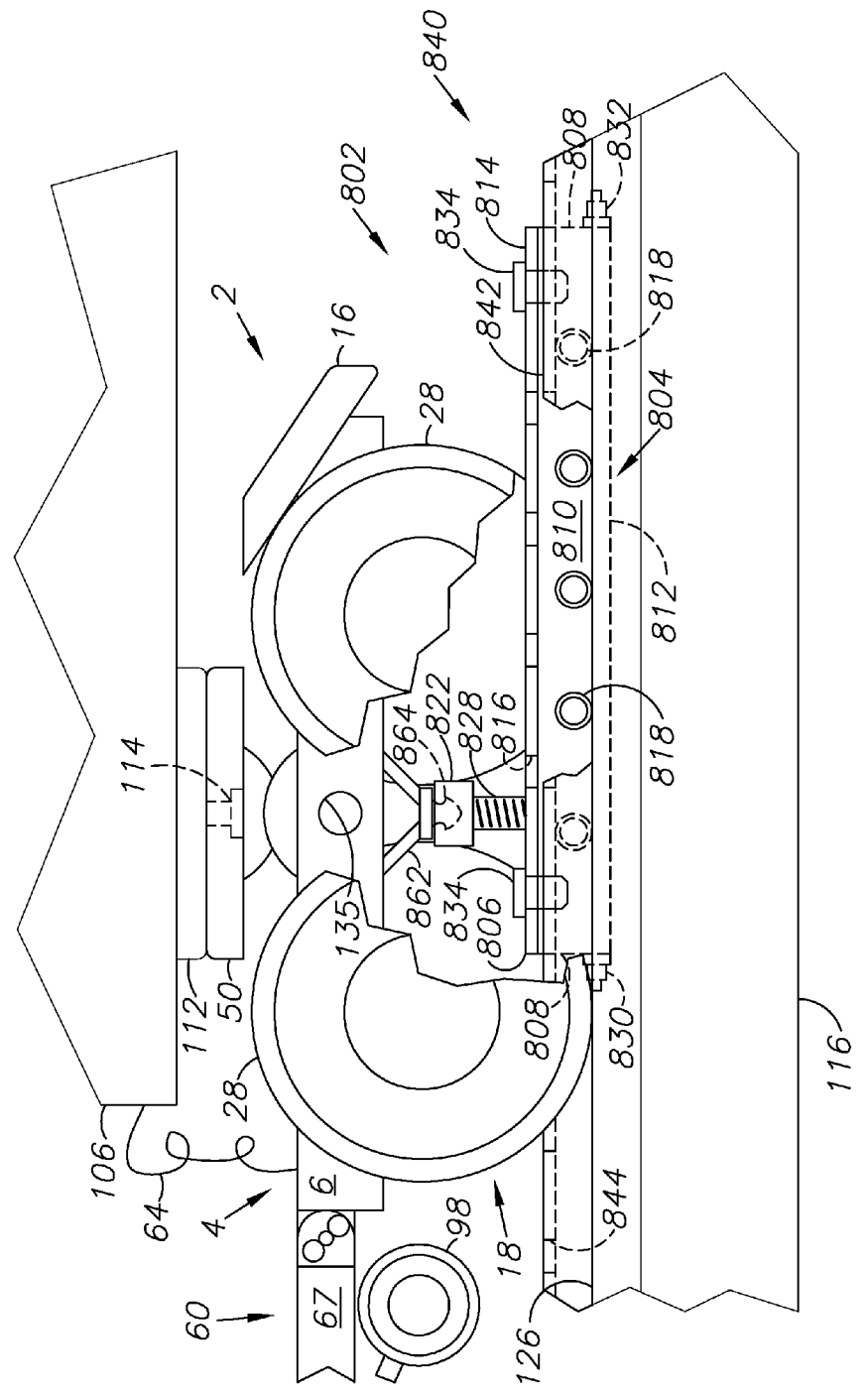
FIG. 24 is an enlarged elevational view of the trolley connected to the dolly taken generally within circle 24 in FIG. 22.
Figure 26:
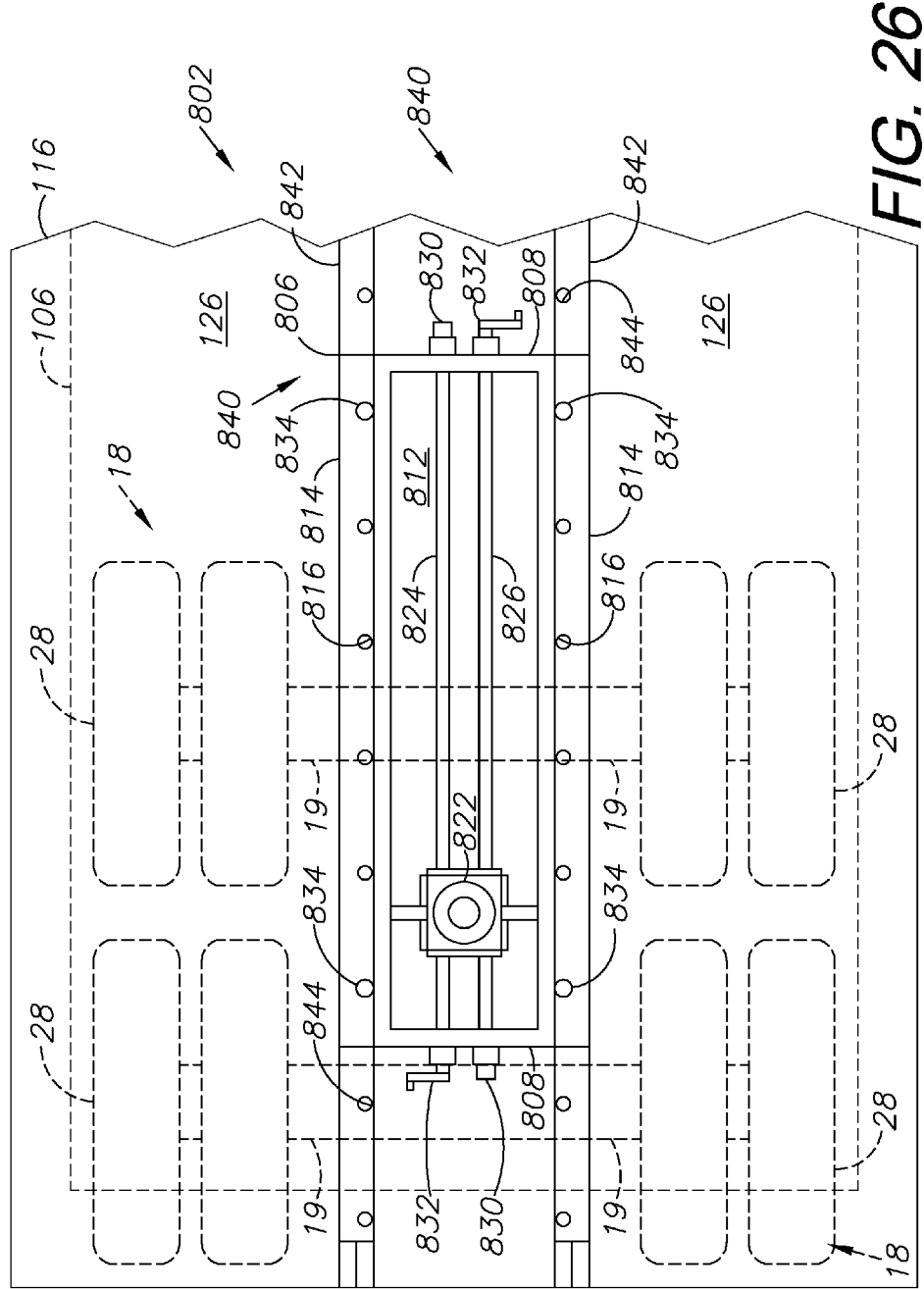
FIG. 26 is an enlarged plan view of the trolley connected to a dolly on a railcar taken generally within circle 26 in FIG. 25.
Figure 27:
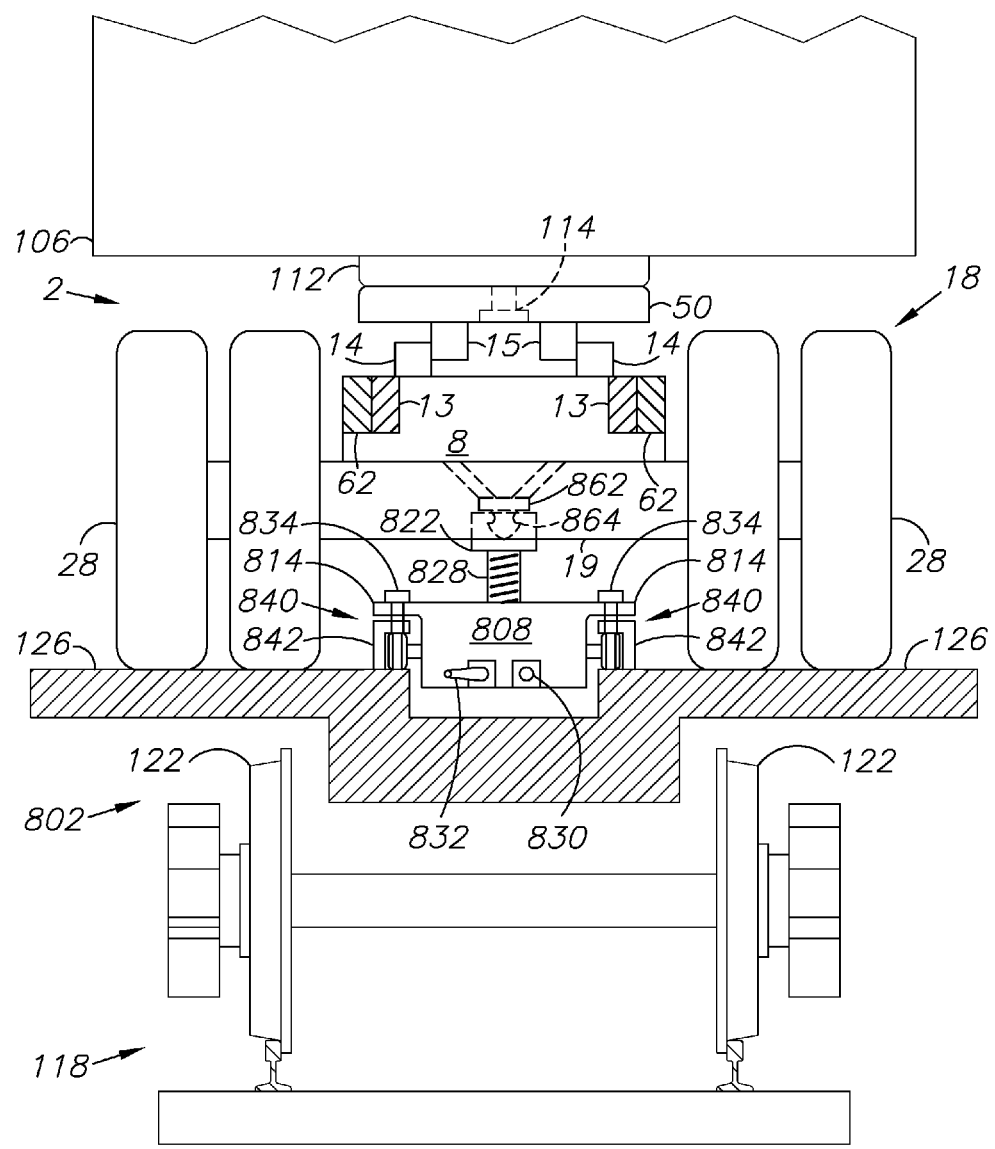
FIG. 27 is a sectional view of the trolley and dolly on a railcar taken along the line 27 in FIG. 22.

Referring to FIGS. 24 and 26, the trolley 804 is shown connected to a dolly 2 as described above however, the trolley 804 is located entirely on one railcar 116 therefore, two pairs of locking members 834 at either end of the trolley 804 are used to secure the trolley 804 to the railcar 116.

The trolley 804 described above has been shown connected to a dolly however, the trolley 804 may be connected to any suitable object having a hitch 864 depending therefrom including, but not limited to a tractor, a trailer, or an accessory. An accessory may include, and is not limited to a fifth wheel stand 952, or a connector ring 1062.

X. First Alternative Embodiment Trolley System 902

Figure 28:
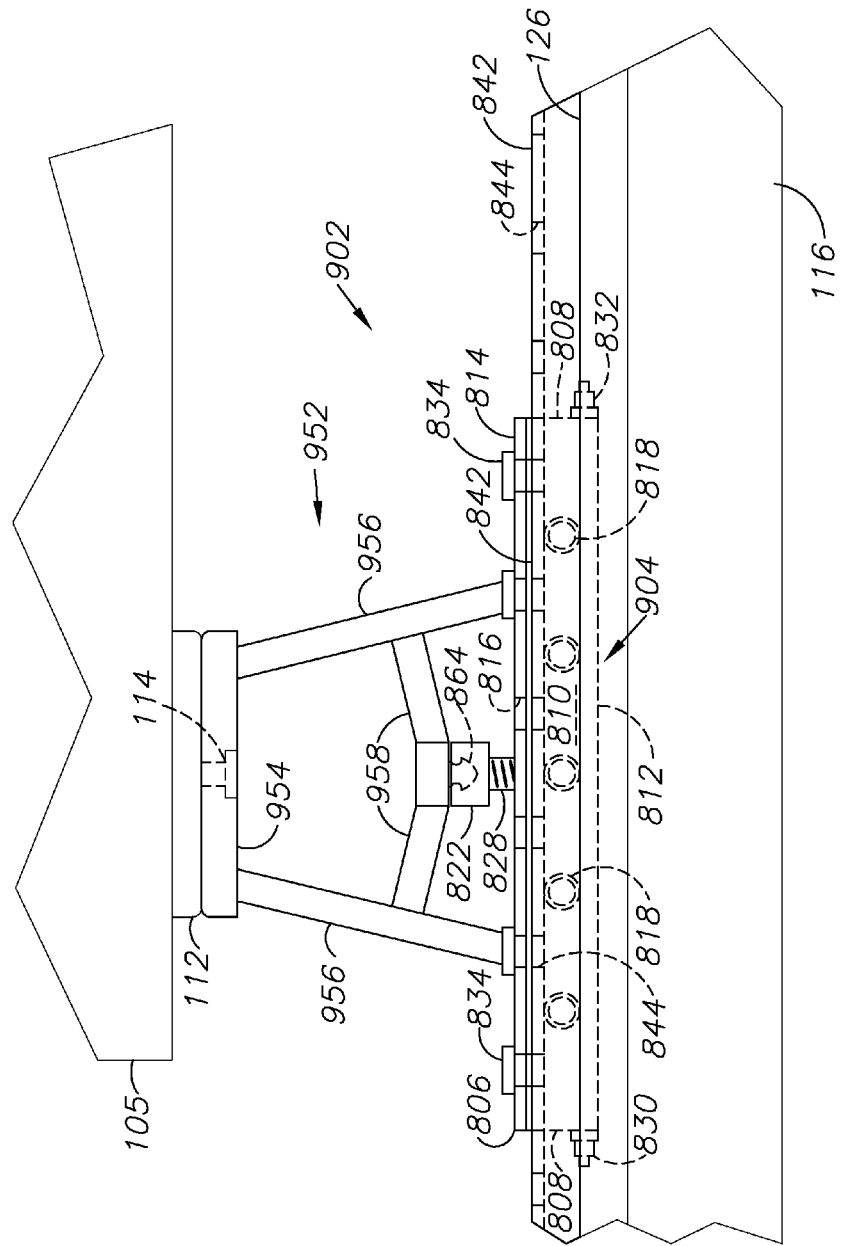
FIG. 28 is an elevational view of an alternative embodiment trolley system embodying principles of the disclosed subject matter whereby the trolley is supporting a trailer with a fifth wheel trailer stand.
Figure 29:
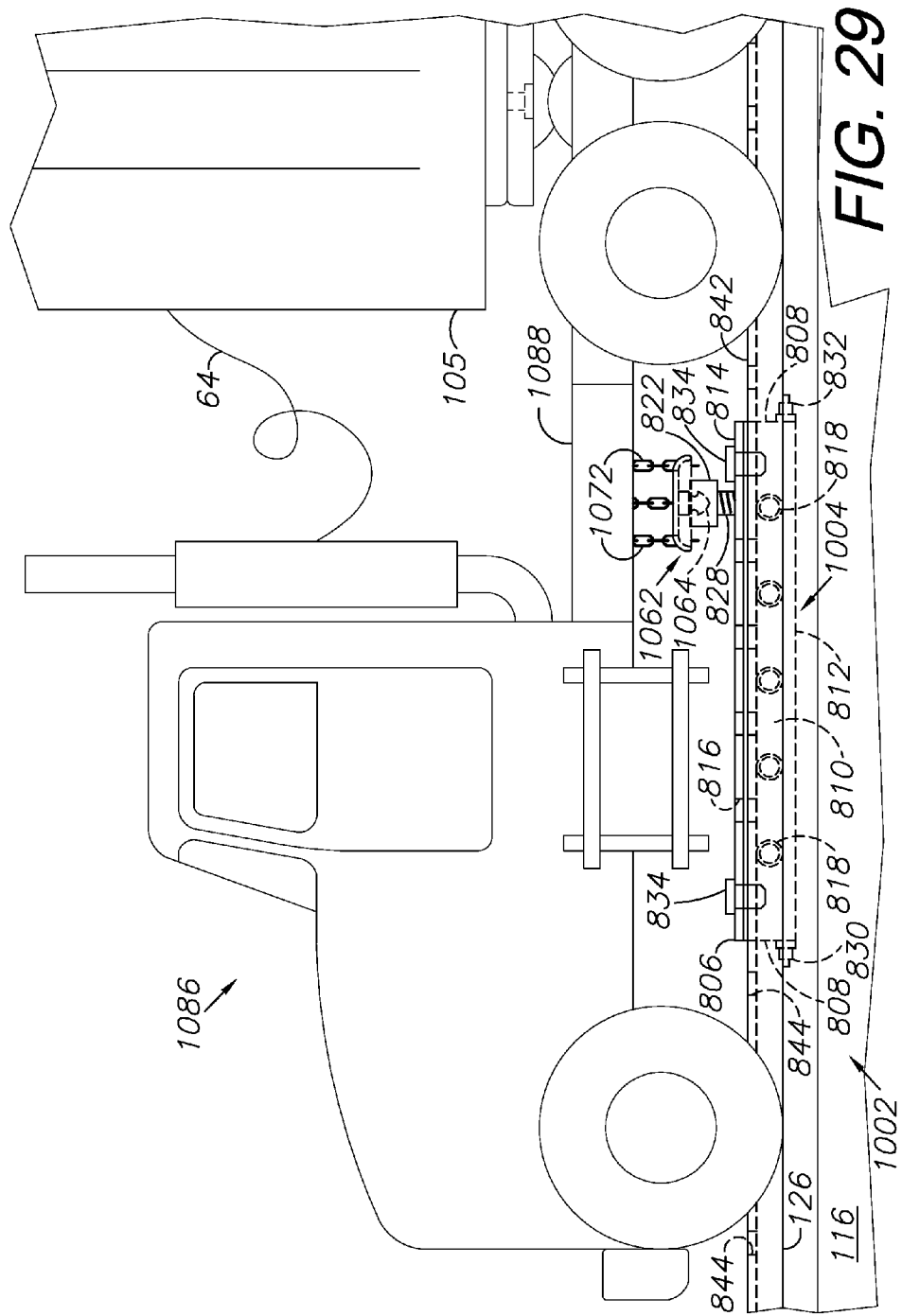
FIG. 29 is an elevational view of an alternative embodiment trolley system embodying principles of the disclosed subject matter whereby the trolley is securing a tractor with an adapter and chains.
Figure 30:
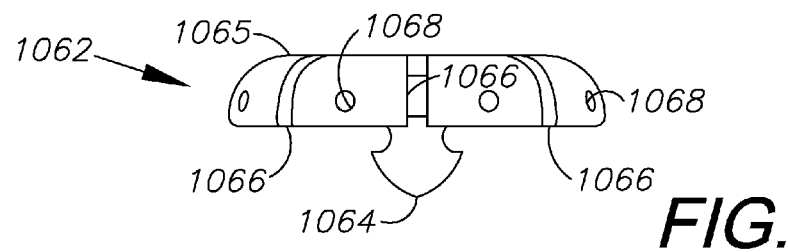
FIG. 30 is an elevational view of the adapter without chains.
Figure 31:
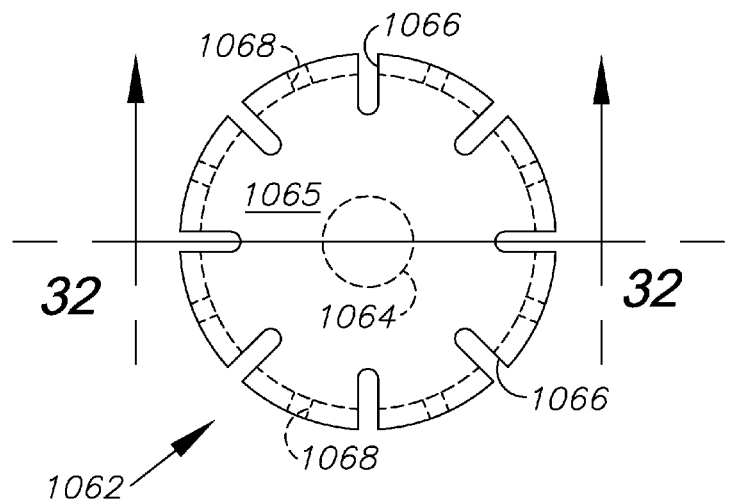
FIG. 31 is a plan view of the adapter without chains.
Figure 32:
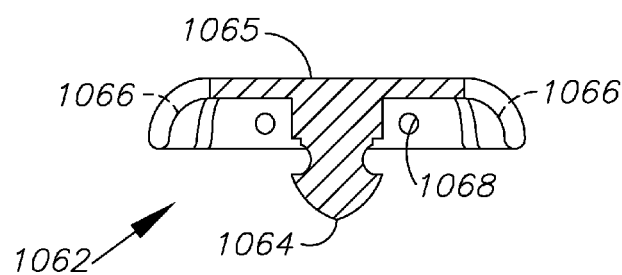
FIG. 32 is a sectional view of the adapter along the line 32 in FIG. 31.

Reference numeral 902 generally designates a first alternative embodiment trolley system embodying the principles of the disclosed subject matter. Referring to FIG. 28, the trolley system 902 is shown and described including a trolley 904 having a fifth wheel stand 952 that may support the forward end of a lead-trailer 105. A fifth wheel plate 954 is located at the top of the stand 952 for receiving the bearing plate 112 and hitch component 114 on the trailer 105. The plate 954 is connected to the trolley 904 by four elongated support members 956 depending, and equally spaced at the periphery of the plate 954. The opposite end of the supports 956 are received within the receivers 816 in the flange 814. A hitch 864, centered below the plate 954, is connected to each of the supports 956 by brackets 958. The hitch component 822 is positioned below the hitch 864 as described above and attaches to the hitch 864 securing the stand 952, and in turn the trailer 105 to the trolley 202. The trolley 904 may be movable on the railcar 116 within a trolley guide 840, and secured to the railcar using the locking members 834 as described above.

XI. Second Alternative Embodiment Trolley System 1002

Reference numeral 1002 generally designates a second alternative embodiment trolley system embodying the principles of the disclosed subject matter. Referring to FIGS. 29-32, the trolley system 1002 is shown and described including a trolley 1004 securing an object, such as a tractor 1086 to a railcar 116 using a connector ring 1062. The connector ring 1062 is a circular mushroom-shaped device having a hitch 1064, similar to the hitch 864 described above, depending from the center. A plurality of slots 1066 radiate out from the top of the body 1065 providing an attachment point for the links of a chain 1072 hanging below the frame 1088 of the tractor 1086. A plurality of eyelets 1068 located at the edge of the body 1065 are provided for receiving hooks (not shown) that may be attached to the end of the chains 1072. The connector ring 1062 is mounted by either first attaching the ring 1062 to the chains 1072, or by attaching the ring 1062 to the trolley 1004. When first attaching the ring 1062 to the chains 1072, three or more chains 1072 are equally spaced apart and connected to the slots 1066 or eyelets 1068 in the connector 1062. The trolley 1004 is then positioned below the hitch 1064 and attached in the manner described above. When first attaching the ring 1062 to the trolley 1004, the hitch 1064 is placed in the hitch component 822 and the ring 1062 is raised to a height below the frame 1088 to enable the chains 1072 to be properly connected. When the chains 1072 are connected, the hitch component 822 is drawn down toward the trolley 1004 securing the tractor 1086 to the railcar 116. The trolley 1004 may be movable on the railcar 116 within a trolley guide 840, and secured to the railcar 116 using the locking members 834 as described above.

XII. Third Alternative Embodiment Trolley System 1102

Figure 33:
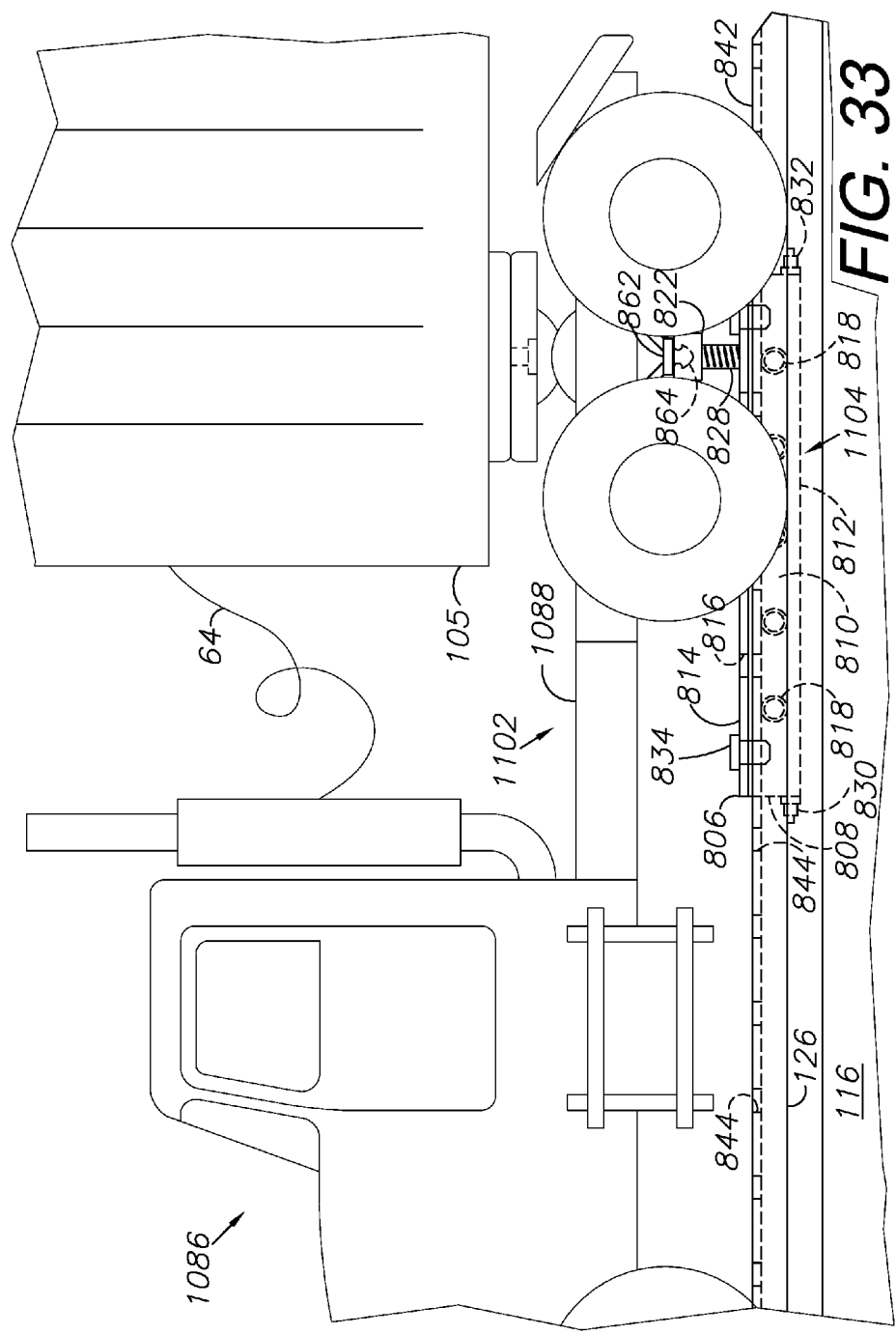
FIG. 33 is an elevational view of an alternative embodiment trolley system embodying principles of the disclosed subject matter whereby the trolley is securing a tractor using a mount secured to the frame.

Reference numeral 1102 generally designates a third alternative embodiment trolley system embodying the principles of the disclosed subject matter. Referring to FIG. 33, the trolley system 1102 is shown and described including a trolley 1104 securing a tractor 1086 to a railcar 116 using a hitch 864 directly attached to the frame 1088 of the tractor 1086 by a mount 862. The trolley 1104 operates in the same fashion as the trolley system 802 described above when positioning the trolley 1104 along the railcar 116 using the trolley guide 840, and securing the tractor 1086 to the railcar 116.

XIII. Fourth Alternative Embodiment Trolley System 1202

Figure 34:
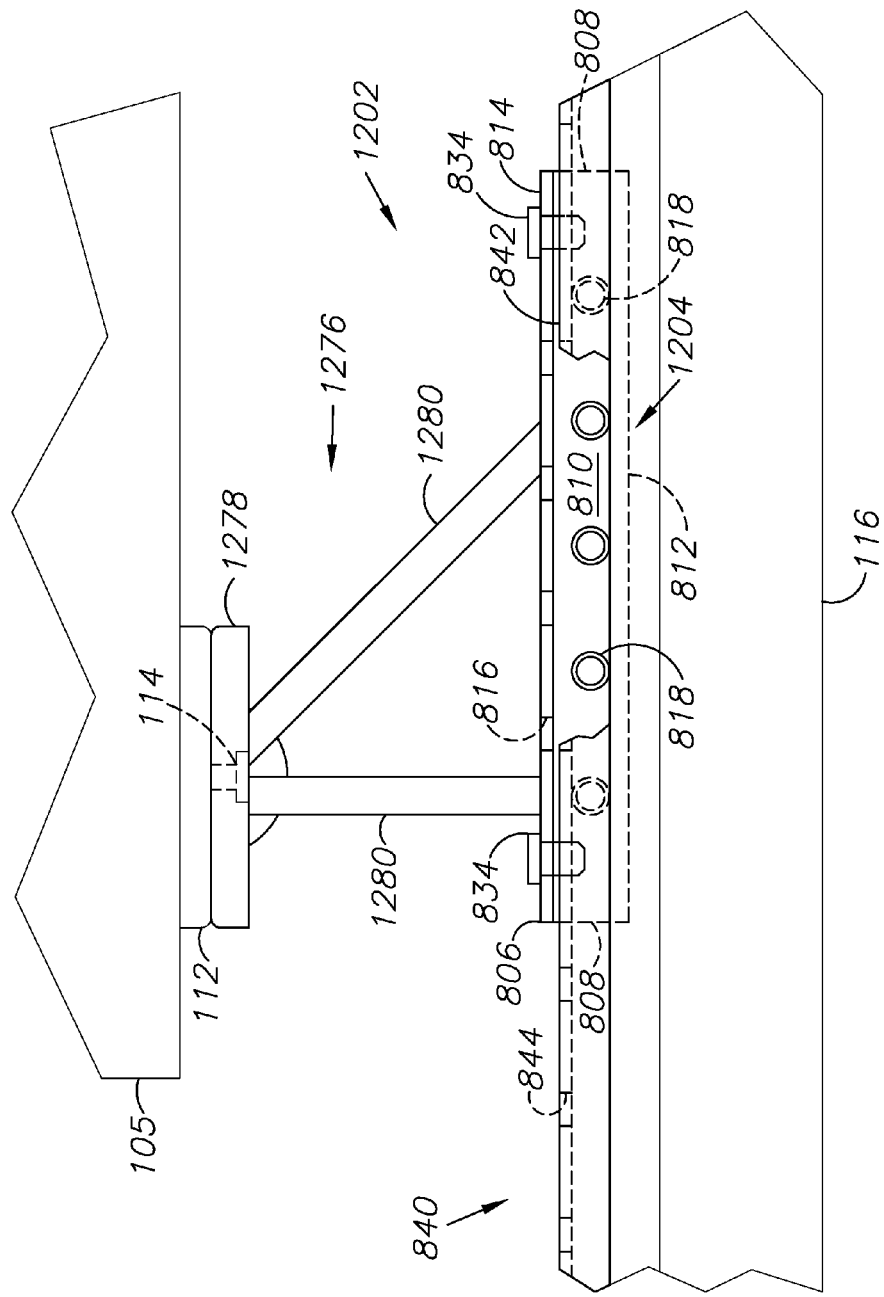
FIG. 34 is an elevational view of an alternative embodiment trolley system embodying principles of the disclosed subject matter whereby the trolley is supporting a trailer with a stanchion.

Reference numeral 1202 generally designates a fourth alternative embodiment trolley system embodying the principles of the disclosed subject matter. Referring to FIG. 34, the trolley system 1202 is shown and described including a trolley 1204 having a collapsible stanchion 1276 for supporting an end of a trailer 105 having a hitch component 114. The trolley 1204 is generally of the same construction as the trolley 804 above without the hitch component 822 and the associated actuators and hardware supporting the hitch component 822 operation. The instant trolley 1204 has a stanchion 1276 supported by vertical and angular supports 1280 mounting a stanchion plate 1278. The stanchion plate 1278 is laterally self aligning and operates in the same manner as the hitch component 50 described above for receiving the bearing plate 112 and the hitch component 114 of a trailer 105. The trolley 1204 may be movable along the railcar 116 using the trolley guide 840, and secured to the railcar 116 using the locking members 834 as described above. The trolley 1274 may remain with the railcar 116 when not in use.

XIV. Fifth Alternative Embodiment Trolley System 1302

Figure 35:
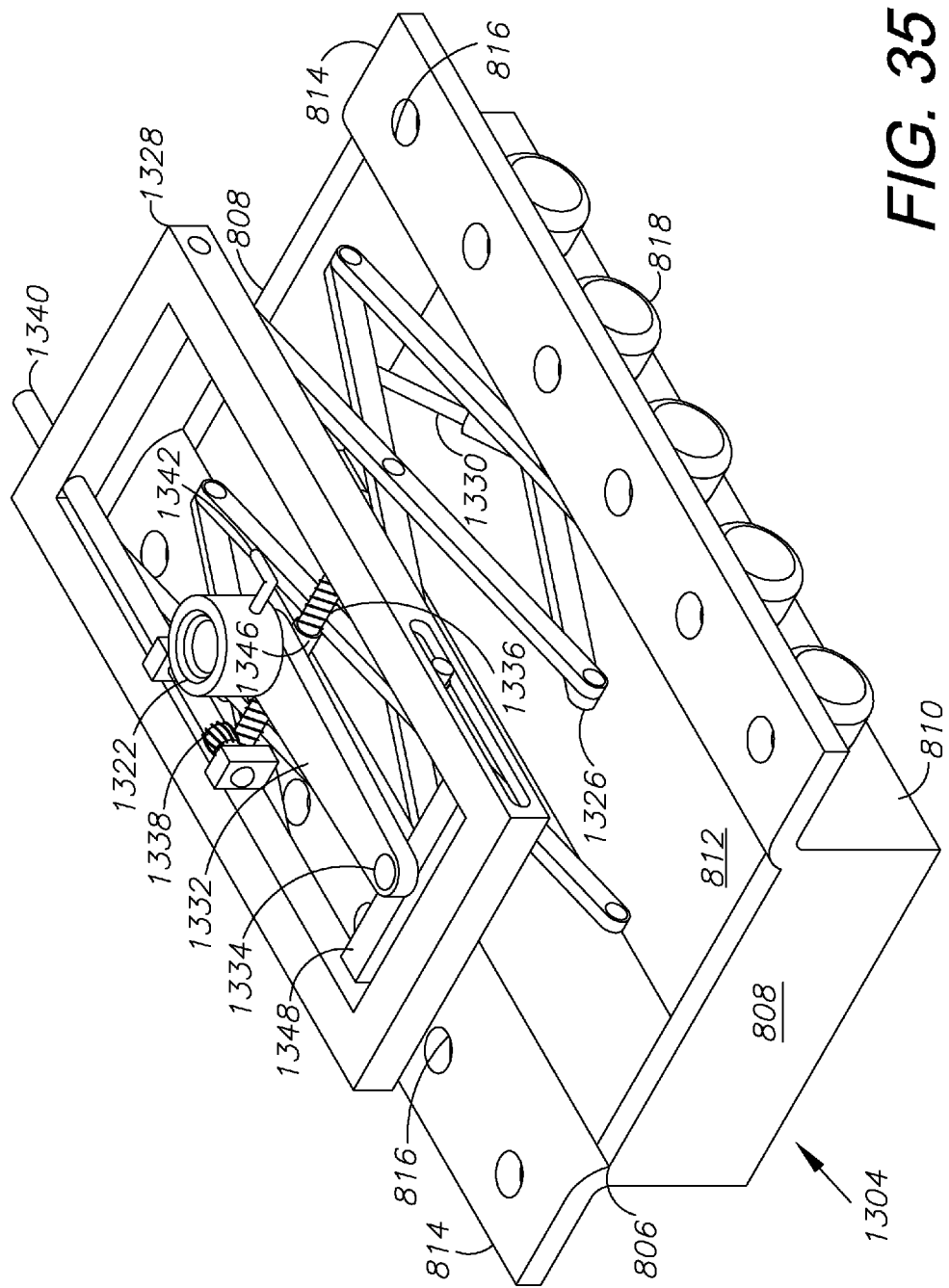
FIG. 35 is a perspective view of an alternative embodiment trolley system embodying principles of the disclosed subject matter whereby the trolley is using a scissor lift to raise and lower an adjustable hitch.
Figure 36:
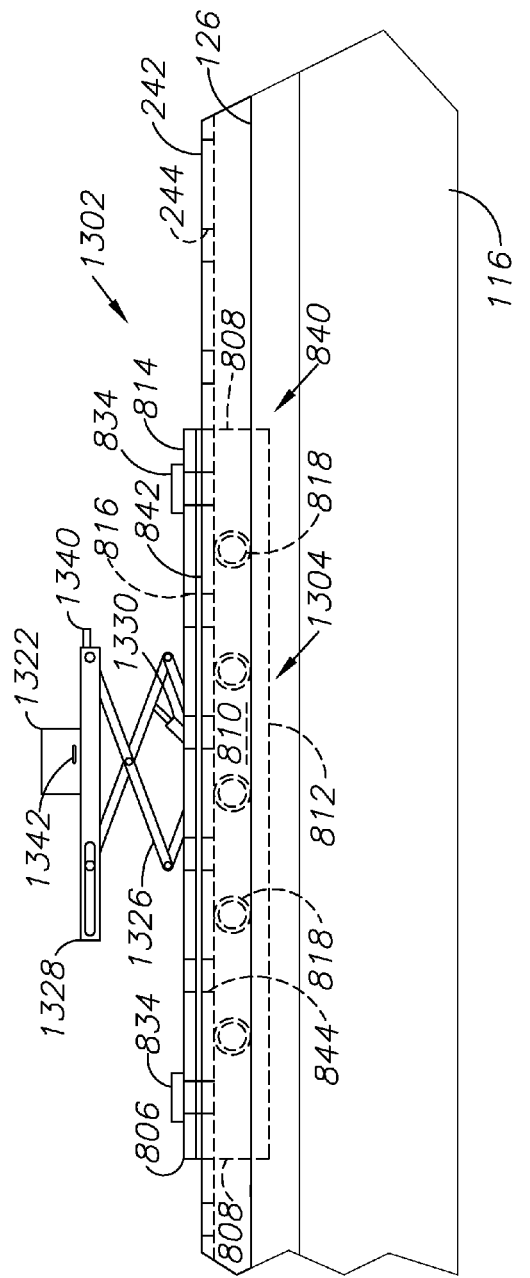
FIG. 36 is an elevational view of the trolley system of FIG. 35.
Figure 37:
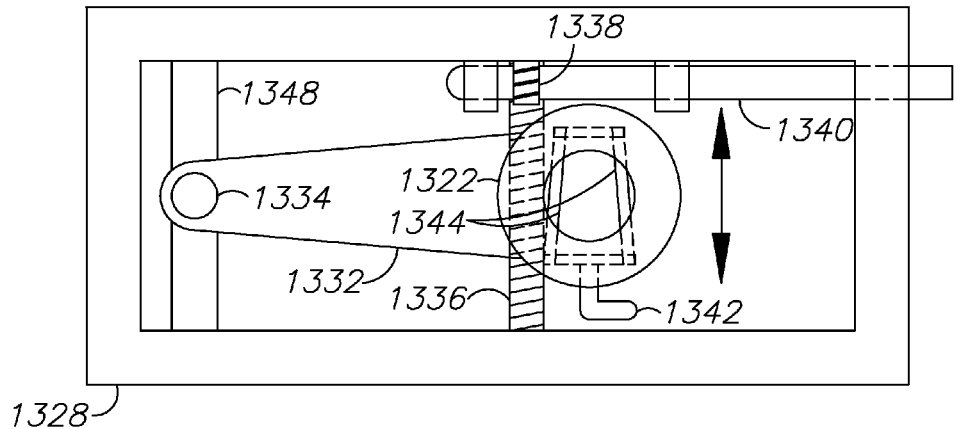
FIG. 37 is a plan view of the trolley of FIG. 35.

Reference numeral 1302 generally designates a fifth alternative embodiment trolley system embodying the principles of the disclosed subject matter. Referring to FIGS. 35-37, the trolley system 1302 is shown and described including a trolley 1304 using a scissor lift 1326 to raise and lower a hitch component 1322. The trolley 1304 is shown absent the trolley guide 840, however the instant trolley 1304 moves within the trolley guide 840 in the same manner as the trolleys mentioned above. The scissor lift 1326 is designed and functions in a similar manner to a conventional scissor lift using an actuator 1330 to bias against the lifting structure to raise and lower a frame 1328. The actuator 1330 is powered by a complimentary power source and may comprise the types of actuators used in conjunction with the height actuator 828 described above. Alternatively, the frame 1328 may be raised and lowered using the I-Lock Spiralift described above. The hitch component 1322 is laterally adjustable by rotating a shaft 1340 having a gear 1338 against a worm gear shaft 1336. The hitch component 1322 is connected to the worm gear shaft 1356 by a collar 1346. The collar 1346 pivots on the arm 1332 when the hitch component 1322 is moved laterally. The arm 1332 is connected to the frame 1328 by a crossbar 1348 having a pin 1334. The pin 1334 permits the arm 1332 and hitch component 1322 to rotate thereabout. The shaft 1340 may be rotated by a hand crank, electric motor, or an air ratchet to align the hitch component 1322 with a hitch 864. A pair of rods 1344 for capturing the hitch 864 within the hitch component 1322 are spring loaded to engage the hitch 864. A lockout lever 1342 has a cam that is rotated to separate the rods 1344 for disengaging the hitch component 1322 and hitch 864 (FIG. 37). The trolley 1304 may be secured to the railcar using the locking members 834 as described above.

XV. Sixth Alternative Embodiment Trolley System 1402

Figure 40:
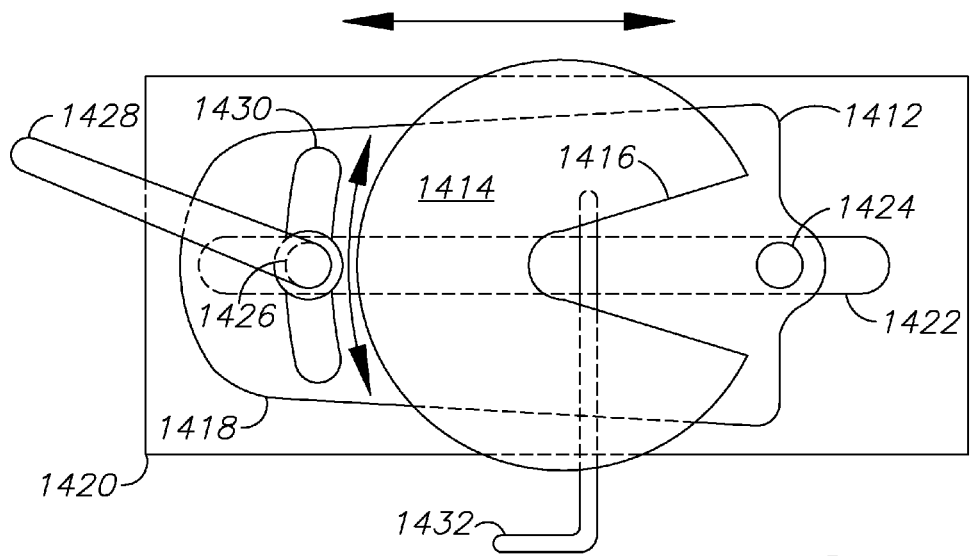
FIG. 40 is a plan view of the trolley of FIG. 38.
Figure 38:
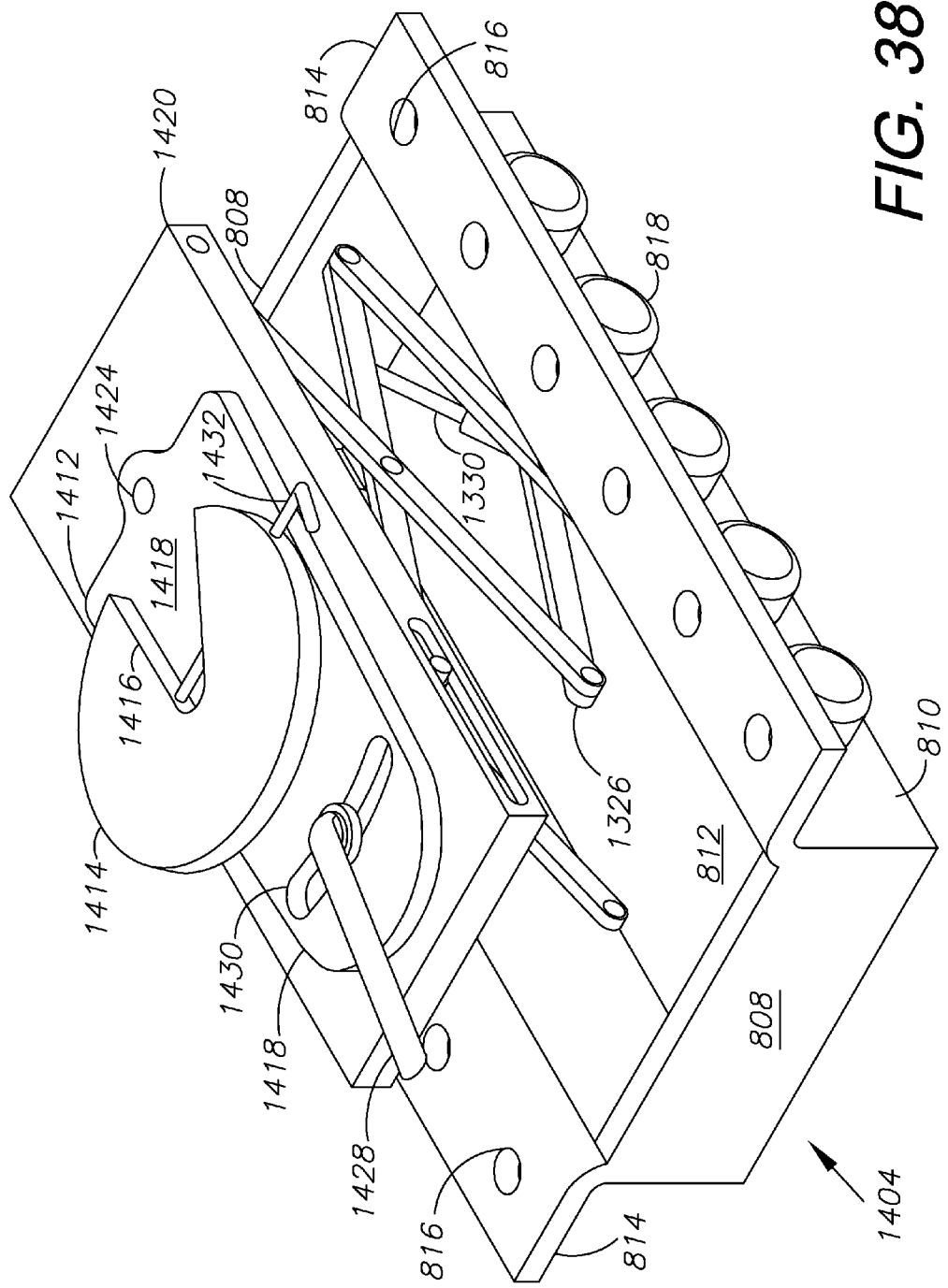
FIG. 38 is a perspective view of an alternative embodiment trolley system embodying principles of the disclosed subject matter whereby the trolley is using a scissor lift to raise and lower a mini fifth wheel hitch.
Figure 39:
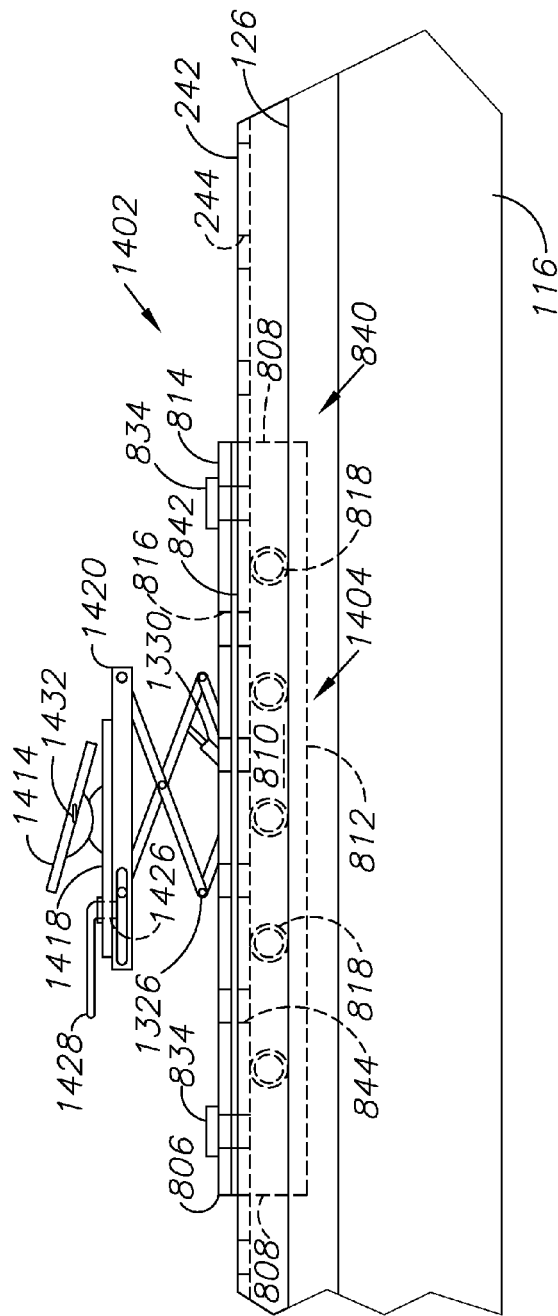
FIG. 39 is an elevational view of the trolley system of FIG. 38.

Reference numeral 1402 generally designates a sixth alternative embodiment trolley system embodying the principles of the disclosed subject matter. Referring to FIGS. 38-40, the trolley system 1402 is shown and described including a trolley 1404 using a scissor lift 1326 to raise and lower a mini-fifth wheel hitch 1412. The scissor lift 1326 is designed and functions in a similar manner as above, and is used to raise and lower a platform 1420 having a mini fifth wheel hitch 1412 attached. The fifth wheel hitch 1412 has a pickup plate 1414 with a slot 1416 for receiving the kingpin of a trailer. The fifth wheel hitch 1412 is pivotally attached to a base plate 1418. The base plate 1418 is movable along the length of the platform 1420 within an elongated aperture 1422 disposed within the platform 1420. A pivot pin 1424 at the rear of the base plate 1418, and a guide pin 1426 extending from the lever 1428 at the front of the base plate 1418, guide the base plate 1418 along the aperture 1422. Because the kingpin on a trailer may not perfectly align with the center of the platform 1420, the fifth wheel hitch 1412 may freely move laterally within a curved aperture 1430 in the base plate 1418, pivoting about the pivot pin 1424, to self align when being positioned beneath a trailer and capturing the kingpin. When the fifth wheel hitch 1412 engages the kingpin, a lever 1428, having a guide pin 1426 that passes through the platform 1420 and base plate 1418, may be rotated to create a camming force to press the platform 1420 and plate 1418 together to immobilize the base plate 1418 locking the fifth wheel hitch 1412 in place. A lock out pin 1432 extends across the slot 1416 and may be manually operated to secure the kingpin within the slot 1416. The trolley 1404 may be movable along the railcar 116 using the trolley guide 840, and secured to the railcar using the locking members 834 as described above.

It will be appreciated that the components of the aforementioned trolley systems 802, 902, 1002, 1102, 1202, 1302, and 1402 may be used for various other applications. Moreover, the trolley systems may be fabricated in various sizes and from a wide range of suitable materials, using various manufacturing and fabrication techniques.

It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. A dolly for moving a trailer having a first hitch component, which dolly comprises:
a frame having front and back ends;
a drawbar extending from said frame front end;
an axle assembly depending from said frame, said axle assembly having a ground engaging wheel;
a landing gear assembly pivotally attached to said drawbar, said landing gear assembly comprised of:
(a) a steering mechanism;
(b) a leg having first and second ends, said first end connected to said drawbar; and
(c) a landing gear wheel mounted to said leg second end, said wheel being connected to said steering mechanism;
said landing gear assembly having a lowered position whereby said landing gear wheel engages the ground, and having a raised position whereby said landing gear wheel is proximate to said drawbar; and a second hitch component selectively interconnectable with the first hitch component, said second hitch component disposed on top of said frame.

2. The dolly of claim 1, including:
a drive motor operably connected to one of said axle assembly wheel or said landing gear wheel; and
a drive motor power source operably connected to said motor.

3. The dolly of claim 2, wherein:
said steering mechanism includes a steering actuator for rotating said leg; and
a steering mechanism power source operably connected to said steering actuator.

4. The dolly of claim 3, including:
a landing gear actuator, said landing gear actuator including a piston and cylinder unit pivotally connected to said frame and said leg for positioning said landing gear assembly between a lowered position and a raised position; and
a landing gear actuator power source operably connected to said landing gear actuator.

5. The dolly of claim 3, including:
said leg comprising a piston and cylinder unit movable between an extended position and a retracted position;
a leg actuator operably connected to said leg for extending and retracting said leg; and
a leg actuator power source operably connected to said leg actuator.

6. The dolly of claim 3, further including:
a braking system, said braking system operably connected to said axle assembly; and
a braking system power source operably connected to said braking system.

7. The dolly of claim 6 wherein said dolly-to-trailer hitch second component is movable vertically with respect to said frame.

8. The dolly of claim 1, including:
a pitch actuator located on said frame;
said pitch actuator attached to said frame and contacting said dolly-to-trailer hitch second component; and
a pitch actuator power source operably connected to said pitch actuator.

* * * * *